(12) United States Patent
Sun et al.

(10) Patent No.: US 10,666,874 B2
(45) Date of Patent: May 26, 2020

(54) REDUCING OR ELIMINATING ARTIFACTS IN HIGH DYNAMIC RANGE (HDR) IMAGING

(71) Applicant: Apple Inc., Cupertino, CA (US)

(72) Inventors: Hao Sun, San Jose, CA (US); Fabio Riccardi, Menlo Park, CA (US); Garrett M. Johnson, San Francisco, CA (US); Farhan A. Baqai, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/979,259

(22) Filed: May 14, 2018

(65) Prior Publication Data

US 2018/0352134 A1 Dec. 6, 2018

Related U.S. Application Data

(60) Provisional application No. 62/514,551, filed on Jun. 2, 2017.

(51) Int. Cl.
*H04N 5/235* (2006.01)
*H04N 5/232* (2006.01)
*H04N 5/355* (2011.01)

(52) U.S. Cl.
CPC ......... *H04N 5/2356* (2013.01); *H04N 5/2355* (2013.01); *H04N 5/23232* (2013.01); *H04N 5/35581* (2013.01)

(58) Field of Classification Search
CPC ............. H04N 5/2356; H04N 5/35581; H04N 5/2355; H04N 5/23232
See application file for complete search history.

(56) References Cited

U.S. PATENT DOCUMENTS

| | | | |
|---|---|---|---|
| 8,525,900 | B2 | 9/2013 | Garten |
| 8,957,984 | B2 | 2/2015 | Vidal-Naquet |
| 8,989,484 | B2 | 3/2015 | Moon |
| 9,338,349 | B2 | 5/2016 | Sharma |
| 2005/0013501 | A1 | 1/2005 | Kang |
| 2011/0211732 | A1 | 9/2011 | Rapaport |

(Continued)

FOREIGN PATENT DOCUMENTS

WO 2014172059 A2 10/2014

*Primary Examiner* — Gevell V Selby
(74) *Attorney, Agent, or Firm* — Blank Rome LLP

(57) ABSTRACT

Techniques of reducing or eliminating artifact pixels in high dynamic range (HDR) imaging are described. One embodiment includes obtaining a first image of a scene at a first time with first exposure settings and obtaining a second image of the scene at a second time with second exposure settings that differ from the first exposure settings. The obtained images may be downsampled. The images may be compared to each other to assist with determining a number of potential artifact pixels in the scene. Depending on a relationship between the number of potential artifact pixels and a threshold value, the first image or second image may be selected as a reference image for registering the images with each other. A type of registration performed between the images may depend on which of the two images is the selected reference image. The registered images may be used to generate an HDR image.

20 Claims, 10 Drawing Sheets

(56) References Cited

U.S. PATENT DOCUMENTS

| | | | |
|---|---|---|---|
| 2015/0226541 A1* | 8/2015 | Aoki | H04N 5/2254 |
| | | | 348/140 |
| 2017/0163902 A1* | 6/2017 | Wu | H04N 5/2355 |
| 2017/0352136 A1* | 12/2017 | Uliyar | H04N 5/353 |
| 2018/0084181 A1* | 3/2018 | Sachs | H04N 5/2356 |

* cited by examiner

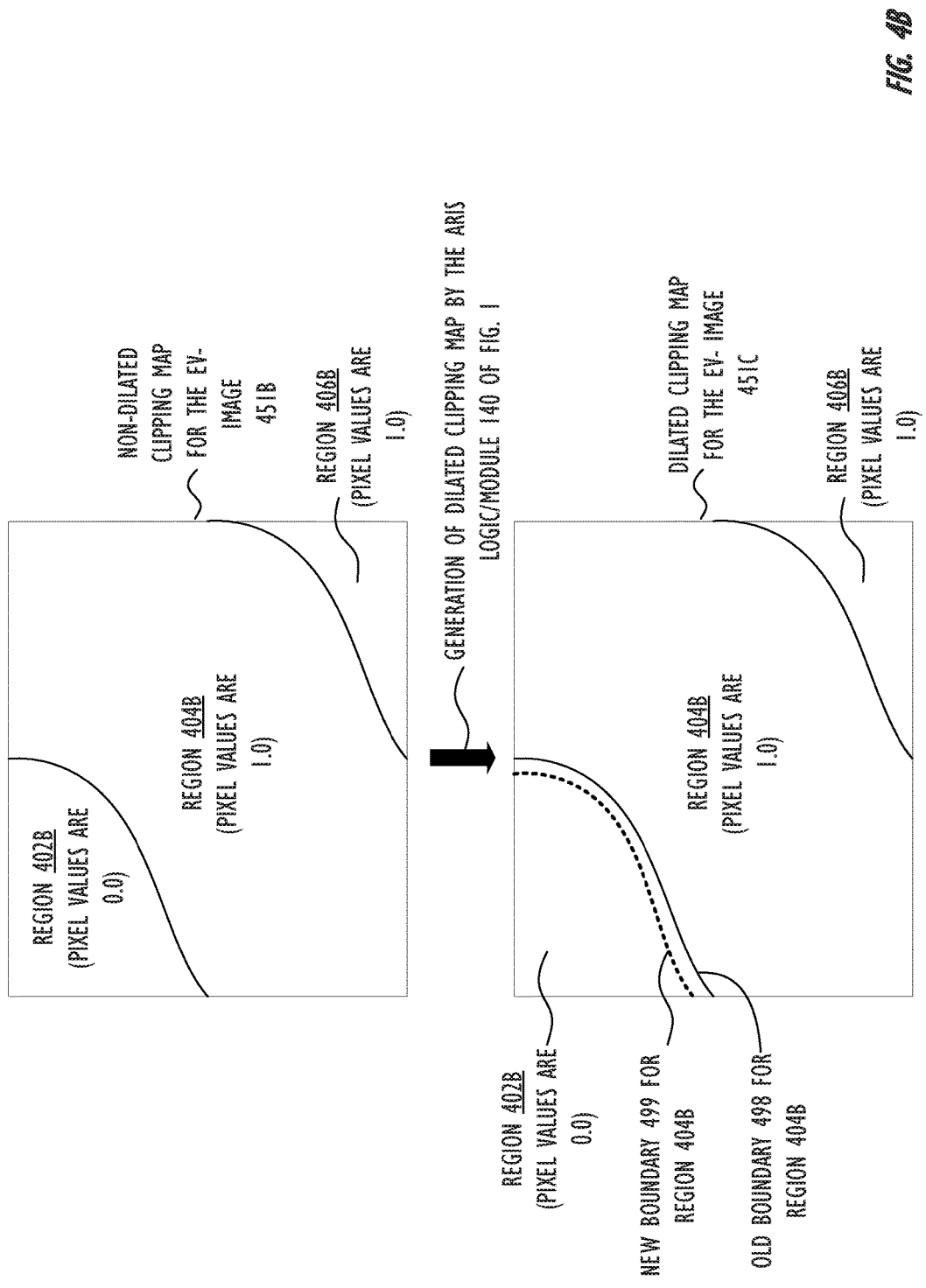

REDUCING OR ELIMINATING ARTIFACTS IN HIGH DYNAMIC RANGE (HDR) IMAGING

CROSS-REFERENCE TO RELATED APPLICATIONS

This application claims priority to U.S. Provisional Application No. 62/514,551, entitled "REDUCING OR ELIMINATING ARTIFACTS IN HIGH DYNAMIC RANGE (HDR) IMAGING," filed Jun. 2, 2017. U.S. Provisional Application No. 62/514,551 is hereby incorporated by reference in its entirety.

TECHNICAL FIELD

Embodiments described herein relate to digital image processing. More particularly, the embodiments described herein relate to reducing or eliminating artifacts in high dynamic range ("HDR") imaging.

BACKGROUND

In photography, a bracketing technique refers to a process of capturing a sequence of images that can be used, e.g., to generate an HDR image. Such a sequence of images can be referred to as a bracket. An example of a conventional bracket is represented as follows:

[$n$(EV−),EV0,$n$(EV+)], where EV0 refers to an image that is captured using an ideal exposure value (EV) given the lighting conditions at hand, where n refers to a number of stops above or below the EV0 image, where $n$(EV−) refers to an underexposed image that is captured at n lower stops than the EV0 image, and where $n$(EV+) refers to an overexposed image that is captured at n higher stops than the EV0 image.

In the conventional bracket shown above, "EV" stands for exposure value and refers to a given exposure level for an image (which may be controlled by one or more settings of a device, such as an imaging device's shutter speed and/or aperture setting). Different images may be captured at different EVs, with a one EV difference (also known as a "stop") between images equating to a predefined power difference in exposure. Typically, a stop is used to denote a power of two difference between exposures. Thus, changing the exposure value can change an amount of light received for a given image, depending on whether the EV is increased or decreased. For example, one stop doubles or halves the amount of light received for a given image, depending on whether the EV is increased or decreased, respectively.

The "EV0" image in a conventional bracket refers to an image that is captured using an exposure value as determined by an imaging device's exposure algorithm. Generally, the EV0 image is assumed to have the ideal exposure value (EV) given the lighting conditions at hand. It is to be understood that the use of the term "ideal" in the context of the EV0 image herein refers to an ideal exposure value, as calculated for a given image capture system. In other words, it is a system-relevant version of ideal exposure. Different image capture systems may have different versions of ideal exposure values for given lighting conditions and/or may utilize different constraints and analyses to determine exposure settings for the capture of an EV0 image. The "EV−" image refers to an underexposed image that is captured at a lower stop (e.g., 0.5, 1, 2, or 3 stops) than the EV0 image. For example, a "1EV−" image refers to an underexposed image that is captured at one stop below the exposure value of the EV0 image. The "EV+" image refers to an overexposed image that is captured at a higher stop (e.g., 0.5, 1, 2, or 3) than the EV0 image. For example, a "2EV+" image refers to an overexposed image that is captured at two stops above the exposure value of the EV0 image.

A common approach to HDR image creation comprises: (i) sequentially capturing a bracket with different exposure settings (e.g., the EV0 image, the EV− image, the EV+ image, etc.); (ii) performing image registration on the bracket's images; (iii) performing image fusion on the registered images; and (iv) tone mapping the fused images. For the image registration and image fusion techniques, one conventional technique is to set the EV0 image as the reference image and then register, warp, and fuse other images (e.g., the EV− image, the EV+ image, etc.) to the EV0 image. One technique of image fusion in HDR imaging techniques is to replace pixels in the EV0 image having incomplete information (e.g., clipped pixels, etc.) with corresponding pixels from the EV− image that have complete information to recover some or all of the lost pixel information. This technique, however, may be suboptimal because it always assumes that pixels in the EV0 image having incomplete information will always have corresponding pixels from the EV− image that have complete information. In practice, this assumption is not always true. This is because, in some scenarios, pixels in the EV0 image that have incomplete information might not have corresponding pixels from the EV− image that have complete information due to motion and occlusion. In these scenarios, there are no pixels with complete information that can be used to replace or recover the pixels in the EV0 image having incomplete information. When image registration and image fusion techniques are performed on the bracket using the incomplete EV0 image as the reference image, the resulting HDR image may include one or more artifacts. Pixels affected by unwanted artifacts are also referred to herein as artifact pixels.

To reduce or eliminate artifacts, the EV− image (instead of the EV0 image) may be set as the reference image and then the other images in the bracket may be registered, warped, and fused with the EV− image. Here, the EV− image is used as the reference image based on an assumption that pixels from the EV− image have a lower likelihood of being pixels with incomplete information than corresponding pixels from the EV0 image. One limitation of this technique is that the EV− image is much noisier than the EV0 image, and as a result, the HDR image will be much noisier than an HDR image formed using the EV0 image as the reference image.

SUMMARY

Embodiments of methods, apparatuses, and systems for techniques of reducing or eliminating artifact pixels in HDR imaging are described. Such embodiments can assist with reducing or eliminating unwanted artifacts in an HDR image generated from a bracket. For one embodiment, the bracket includes two or more images that were captured at different times using the different exposure values. For example, the bracket may include an EV− image and an EV0 image.

For one embodiment, an adaptive reference image selection (ARIS) logic/module receives a first image of a scene captured at a first exposure value and a second image of the scene captured at a second exposure value that is different from the first exposure value. The first exposure value may be underexposed in comparison to the second exposure value.

For some embodiments, the ARIS logic/module can compare one or more pixels in the first image to one or more pixels in the second image. Based (at least in part) on the comparison, the ARIS logic/module can determine a number of potential artifact pixels in the pair of first and second images. For some embodiments, the ARIS logic/module uses the number of potential artifact pixels to select one of the first and second images as a reference image for registering and fusing the two images. The choice of which one of the first and second images is reference image may be based on a relationship between the number of potential artifact pixels and a predetermined threshold value (e.g., a predetermined threshold number of artifact pixels, etc.). For example, the ARIS logic/module selects the first image as the reference image when the number of potential artifact pixels in the first and second images is equal to or exceeds a threshold value. For this example, the ARIS logic/module selects the second image as the reference image when the number of potential artifact pixels in the pair of EV0 and EV− images is less than the threshold value.

After selection of the reference image, the ARIS logic/module registers the first image and the second image. For some embodiments, the ARIS logic/module determines the type of registration performed on the two images based, at least in part, on whether the first image or the second image was selected as the reference image. The registered images can be used to generate an HDR image. For example, the registered images can then be fused by an HDR image generation logic/module to assist with generating an output HDR image that has reduced or eliminated artifacts.

Other features or advantages of the embodiments described herein will be apparent from the accompanying drawings and from the detailed description that follows below.

BRIEF DESCRIPTION OF THE DRAWINGS

Embodiments described herein are illustrated by way of example and not limitation in the figures of the accompanying drawings, in which like references indicate similar features. Furthermore, in the figures some conventional details have been omitted so as not to obscure the inventive concepts described herein.

FIGS. 4A-4F illustrate embodiments of some aspects of the process shown in FIG. 3.

DETAILED DESCRIPTION

Embodiments of methods, apparatuses, and systems for techniques of reducing artifact pixels in HDR imaging are described. Such embodiments can assist with reducing unwanted artifacts in an HDR image generated from a bracket.

Embodiments of the artifact reduction/elimination techniques set forth herein can assist with improving the functionality of computing devices or systems that generate HDR images. More specifically, computer functionality can be improved by enabling computing devices or systems that use the described artifact reduction techniques for generating HDR images to reduce or eliminate the need to use de-ghosting algorithms on the generated HDR images. In this way, the described artifact reduction/elimination techniques can assist with reducing or eliminating wasted computational resources (e.g., memory, processing power, computational time, etc.). For example, at least one embodiment described herein includes a composite image formed from two or more images of a bracket, where the reference image of the bracket was selected based on a predicted number of artifact pixels in one of the two or more images. For this example, the adaptive selection of the reference image enables formation of a composite image that can assist with reducing the likelihood that a resulting HDR image includes an artifact. This reduced likelihood can, in turn, reduce or eliminate the need to devote computational resources to de-ghosting techniques. Reducing or eliminating computational resources devoted to de-ghosting techniques can, for example, improve the processing capabilities of the device or system.

Figure 1:
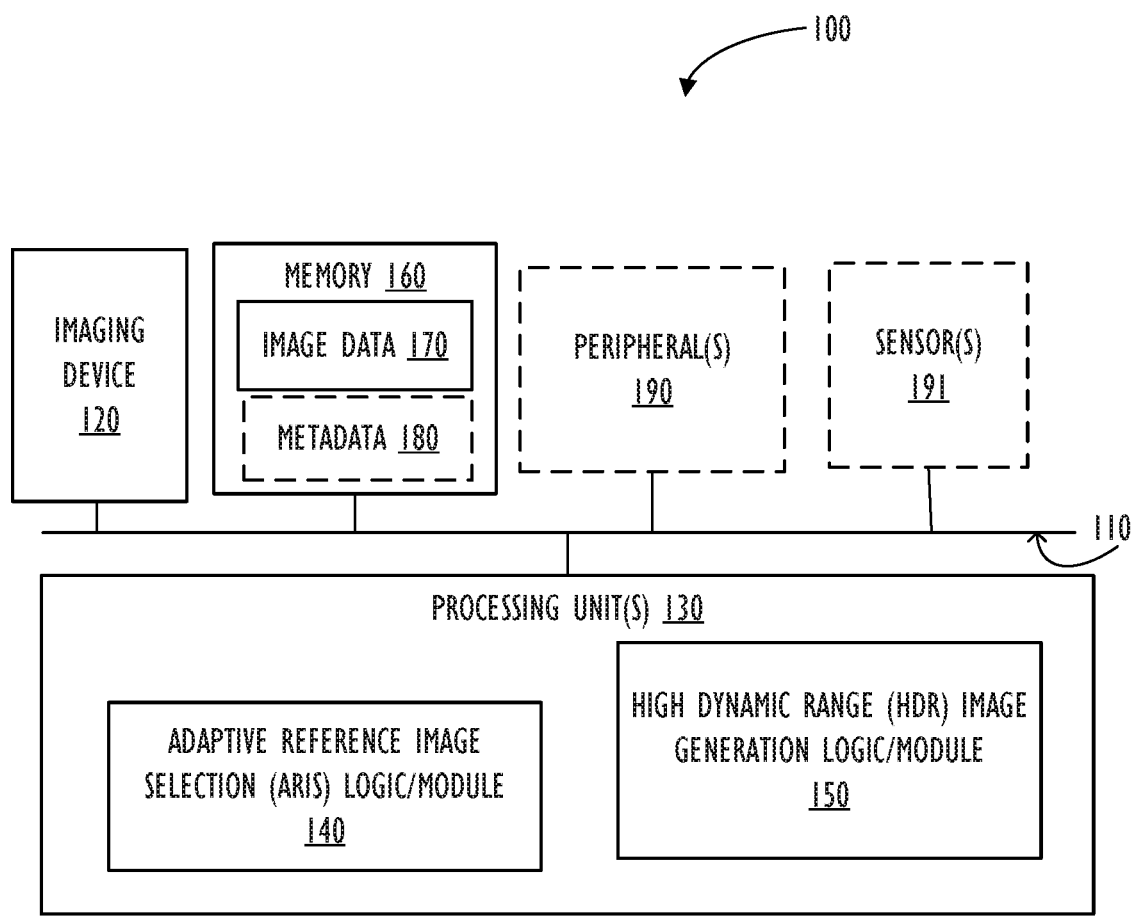
FIG. 1 is a block diagram of a processing system, which includes electronic components that can perform a technique of reducing or eliminating artifact pixels in HDR imaging according to one embodiment.

FIG. 1 is a block diagram illustration of a processing system 100 that can perform an artifact reduction/elimination technique according to one embodiment. The system 100 can be housed in a single computing device, such as a desktop computer, a laptop computer, a tablet computer, a server, a mobile phone, a media player, a personal digital assistant (PDA), a personal communicator, a gaming device, a network router or hub, a wireless access point (AP) or repeater, a set-top box, a wearable device, a vehicle, an Internet-of-Things (IoT) device, or a combination thereof. Alternatively, the components of system 100 can be temporally separated and implemented on separate computing systems that are connected by the communication mechanism 110, which is described in further detail below.

For one embodiment, the system 100 may include processing unit(s) 130, which includes at least one of an adaptive reference image selection (ARIS) logic/module 140 or an HDR image generation logic/module 150. The system 100 can also include a communication mechanism 110, memory 160 that includes at least one of image data 170 or metadata 180, an imaging device 120, peripheral(s) 190, and/or sensor(s) 191. Each of the metadata 180, the peripheral(s) 190, and the sensor(s) 191 is illustrated with a dashed box to show that it is an optional component of the system 100. Nevertheless, one or more of the metadata 180, the peripheral(s) 190, and the sensor(s) 191 is not always an optional component of the system 100—some embodiments of the system 100 may require at least one of the metadata 180, the peripheral(s) 190, or the sensor(s) 191 (e.g., a camera, a smartphone with a camera, etc.). Each component in the system 100 is described below.

As shown in FIG. 1, the system 100 can include all the necessary circuitry and memory for performing the artifact reduction techniques described herein. For one embodiment, the system 100 includes processing unit(s) 130, such as central processing units (CPUs), graphics processing units (GPUs), and other types of integrated circuits (ICs). For one embodiment, the processing unit(s) 130 enable the system 100 to manipulate computer graphics and/or perform image processing. For one embodiment, the processing unit(s) 130 includes at least one logic/module (e.g., an ARIS logic/module 140, an HDR image generation logic/module 150, etc.). Each logic/module in the processing unit(s) 130 can be implemented as at least one of hardware (e.g., electronic circuitry of the processing unit(s) 130, circuitry, dedicated logic, etc.), software (e.g., one or more instructions of a computer program executed by the processing unit(s) 130, software run on a general-purpose computer system or a dedicated machine, etc.), or a combination thereof.

The system 100 may capture a bracket using an imaging device 120 or may have the bracket stored in the memory 160 as part of image data 170. The bracket includes at least two images, where two images of the bracket were captured at different times using the different exposure values. The bracket may, for a first example, be represented as follows:

[$n$(EV−),EV0], where n refers to a number of stops below or above the EV0 image, where $n$(EV−) refers to an underexposed image that is captured at n lower stops than the EV0 image during a first time interval, and where EV0 refers to an image that is captured using an ideal exposure value (EV) given the lighting conditions at hand during a second time interval.

While the example in the immediately preceding paragraph above shows an order where the EV0 image is taken after the EV− image, it should be appreciated that the images may be captured in other orders as appropriate. It should further be appreciated that when "first", "second," etc. are used to distinguish different images, that these designations do not require a sequential capture order. As a second example, and for one embodiment, the bracket may include the EV0 image being captured or stored before the EV− image, represented as follows:

[EV0,$n$(EV−)].

As a third example, and for another embodiment, the bracket may include greater than two images, e.g., with one or more images being captured or stored in between the EV0 and EV− images that are selected for use in the HDR image generation process, represented (in one illustrative example) as follows, wherein the first of three EV0 images and the last of three EV− images, from a bracketed capture of six images, are used in the generation of the HDR image:

[EV0$_{1\ (selected\ for\ use)}$,$n_1$(EV−)$_1$,EV0$_2$,$n_2$(EV−)$_2$, EV0$_3$,$n_3$(EV−)$_{3\ (selected\ for\ use)}$].

As described in further detail below, some embodiments described herein focus on using and/or processing a bracket's EV0 image and/or EV− image. It is to be appreciated that the bracket used in such embodiments may also contain additional images (e.g., an EV+ image, etc.) and that some or all of the images in the bracket may be processed to generate, for example, a high dynamic range (HDR) image. It is also to be appreciated that one or more of the images in the bracket used in such embodiments (e.g., the EV0 image, the EV− image, any other image in the bracket, etc.) may be a single image or a composite image (e.g., an image formed from a plurality of captured images, etc.).

For one embodiment, the ARIS logic/module 140 performs at least one embodiment of an adaptive reference image selection technique, as described herein. That is, the ARIS logic/module 140 selects one image from a pair of images in a bracket as a reference image for registration and fusion techniques. For example, and for one embodiment, the ARIS logic/module 140 may adaptively select one of the EV0 image or the EV− image in a bracket as a reference image for registration and fusion techniques. For one embodiment, the ARIS logic/module 140 selects the reference image based, at least in part, on determining a number of potential artifact pixels in a pair of the bracket's images that consists of the EV0 image and EV− image. For brevity, a pair of the bracket's images that consists of the EV0 image and the EV− image may be referred to herein as the EV0/EV− image pair.

For purposes of this disclosure, the system 100 (e.g., the ARIS logic/module 140, etc.) processes a bracket (e.g., the EV0 image, and the EV− image, etc.) by evaluating the pixel values for one or more pixels of the bracket's images. Each pixel in an image may include a pixel value that represents that pixel's brightness and/or color. Depending on the nature of the image, the pixel value may include one or more individual values. For example, in a grayscale image, the pixel value may be a single number within a range representing the brightness of the pixel, where the minimum number in the range often represents black and the maximum number in the range often represents white. Grayscale imaging often uses an 8-bit integer range, with 0 as the minimum and 255 as the maximum. Conversely, in color imaging, the pixel value may include individual values reflecting different channels components of the color space used by the color model in a given image (e.g., a red-green-blue (RGB) color model, YUV, YCbCr, YPbPr, etc.). For example, an RGB image may include red, blue and green channels, and the pixel value for a given pixel may include a value for each channel. It is to be appreciated that grayscale or color imaging may include image data for each channel that uses an 8-bit integer range, a 10-bit integer range, a 12-bit integer range, a 16-bit integer range, a 32-bit integer range, or any other N-bit integer range (where N represents a value greater than zero). Furthermore, one or more compression techniques can be used to convert image data from a first N-bit integer range to a second N-bit integer range that differs from the first N-bit integer range (where N represents a value greater than zero). For one embodiment, the one or more compression techniques may allow for reconstruction of the first N-bit integer range from the second N-bit integer range with or without any loss of information—that is, the one or more compression techniques are invertible. An example of an invertible compression technique includes, but is not limited to, a square root encoding technique.

Typically, the pixel value for each pixel may be set within a predefined range for each channel. Accordingly, each channel may have a respective maximum value. These maximum values reflect a maximum channel intensity that will be established by the imaging device, and are often set based on the specific image sensor and/or the desired use of the imaging device. As an example, in a grayscale image where pixel brightness is reflected using a pixel value between 0 and 255, the maximum pixel value (255) may represent a threshold scene brightness. Even if the actual scene illumination on a pixel during image capture is brighter than the threshold scene brightness, the pixel value for that pixel will not exceed 255. In these instances, information in the image may be lost as it may not be possible to determine whether a pixel value of 255 was caused by scene illumination at the threshold scene brightness or a brighter level. Throughout this disclosure, the system 100 will be described as identifying pixels in a pair of images from a bracket as potential artifact pixels. For one embodiment, the ARIS logic/module 140 may be configured to identify a plurality of potential artifact pixels from the EV0/EV− image pair. Potential artifact pixels may be identified using one or more criteria. For some examples, the criteria may include one or more of: (i) a pixel that is clipped or is near a clipped pixel in the EV− image; (ii) a pixel that is clipped or is near a clipped pixel in the EV0 image; (iii) a pixel that is clipped in one image from the EV0/EV− image pair but lacks a corresponding clipped pixel in the other image from the EV0/EV− image pair; and (iv) corresponding pixels in the EV0/EV− image pair that are dissimilar, where the dissimilarity includes normalized pixel values of the corresponding pixels differing by at least a threshold amount. For some specific embodiments, the criteria for identifying potential artifact pixels comprises all of the following: (i) a pixel that is clipped or is near a clipped pixel in the EV− image; (ii) a pixel that is clipped in one image from the EV0/EV− image pair but lacks a corresponding clipped pixel in the other image from the EV0/EV− image pair; and (iii) corresponding pixels in the EV0/EV− image pair that are dissimilar, where the dissimilarity includes normalized pixel values of the corresponding pixels differing by at least a threshold amount.

As used herein, a "clipped pixel" and its variants refer to a pixel whose pixel value is equal to or greater than a threshold intensity value for a channel of the pixel. In some instances, the threshold intensity value may be the maximum intensity value for a given channel. When a pixel value includes multiple channels, it should be appreciated that each channel may have its own respective threshold intensity value. As an example, in some variations the pixel value may be represented by a plurality of channels, each having a respective value between a minimum of 0 and a maximum 255. In some instances, each channel may have a threshold intensity value of 255 (the maximum). In these instances, if the value of at least one of these channels is 255, the pixel may be considered a clipped pixel. In other instances, the threshold intensity value may be set below the maximum (e.g., to 247). In these instances, if the value of one of the channels meets or exceeds 247, the pixel may be considered a clipped pixel. It should be appreciated that the threshold intensity value or values may be changed depending on the intended use of the imaging device (e.g., different photography modes).

As alluded to above, this disclosure also refers to corresponding pixels from a pair of images (e.g., the EV0/EV− image pair, etc.) having normalized pixel values that differ by at least a threshold amount. This difference can be caused, at least in part, by motion, illumination changes, noise, and/or misalignment of corresponding pixels due to local motion or image registration failure. In one scenario, motion, illumination changes, and/or noise that causes differences in corresponding pixels of a bracket's images (e.g., the EV− image and the EV0 image, etc.) can be identified by looking at the pixel values for one or more pixels of one or more of the images. One such difference results in a mismatch that affects corresponding pixels in two or more images of a bracket. Here, scene brightness changes between images will affect corresponding pixels of two images by at least a threshold amount such that the corresponding pixels' value differ by more than an acceptable amount. For one example, if a person or other object in a scene moves between two images (e.g., an EV− image and an EV0 image) such that the EV− image is captured when the person or object (e.g., the person's head, etc.) is blocking out a bright light in a given region and the EV0 image is subsequently captured after the person or object (e.g., the person's head, etc.) is no longer blocking the bright light in that region, then there may be an increased difference in the brightness in that region between the EV− and EV0 images beyond what would normally be accounted for by the difference in exposure values between the images. This occlusion may result in one or more corresponding pixels of the EV− and EV0 images being different from each other by at least a threshold amount, which in turn would create artifacts in an HDR image from the EV− and EV0 images.

After the ARIS logic/module 140 identifies the potential artifact pixels in EV0/EV− image pair, the ARIS logic/module 140 may determine whether the total number of potential artifact pixels has a predetermined relationship with a threshold count value. For example, and for one embodiment, the ARIS logic/module 140 may determine whether the total number of potential artifact pixels in EV0/EV− image pair exceeds or is equal to a threshold count value. If the threshold count value is met or exceeded, the ARIS logic/module 140 selects the EV− image as the reference image. On the other hand, if the total number of potential artifact pixels in EV0/EV− image pair is less than the threshold count value, the ARIS logic/module 140 selects the EV0 image as the reference image.

According to some embodiments, the ARIS logic/module 140's choice of a reference image from the EV0/EV− image pair (i.e., the EV0 image or the EV-image) may also affect the choice of image registration techniques used for registration of the bracket's images. With regard to FIG. 1, the HDR image generation logic/module 150 may receive the bracket (and information identifying the ARIS logic/module 140's selected reference image) as input from the ARIS logic/module 140. When the EV0 image is identified as the selected reference image, the HDR generation logic/module 150 applies a first image registration technique to register the EV− image with the reference image (i.e., the EV0 image). On the other hand, when the EV− image is identified as the selected reference image, the HDR generation logic/module 150 applies a second image registration technique to register the EV0 image with the reference image (i.e., the EV− image). The first and second image registration techniques may differ from each other.

For example, in some embodiments, the first registration technique may be selected from among a first list of potential image registration techniques, and the second registration technique may be selected from among a second list of potential image registration techniques. According to some such embodiments, the image registration techniques appearing in the first and second lists of potential image registration techniques may be determined based on the needs of a given implementation. In other embodiments, the image registration techniques appearing in the first and second lists of potential image registration techniques may be mutually exclusive. In still other embodiments, the image registration techniques appearing in the first and second lists of potential image registration techniques may be at least partially overlapping.

Additionally, or alternatively, in some embodiments, the first list of potential image registration techniques may comprise image registration techniques that require fewer computational resources (e.g., in terms of processing power, processing load, processing time, memory, etc.) than the image registration techniques in the second list of potential image registration techniques. The difference between the amounts of computational resources required for the first and second image registration techniques can be equal to or greater than a threshold difference (assuming the techniques are applied to the same images and the reference image is the same).

For embodiments where a distinction is drawn between the computational resources required for performing the first and second image registration techniques, the first image registration technique that is selected when the EV0 image is the reference image may be referred to herein as a "simple image registration technique," and the second image registration technique that is selected when the EV− image is the reference image may be referred to herein as an "advanced image registration technique." Examples of simple image registration techniques may include, but are not limited to: an affine image registration technique, a single homograph image registration technique, or a combination thereof. Examples of advanced image registration techniques may include, but are not limited to, an optical flow image registration technique, a multiple homograph image registration technique, or a combination thereof. In other embodiments, the simple and advanced image registration techniques selected in a given implementation may be different variants of the same kind of image registration technique, e.g., a relatively more simple optical flow image registration technique and a relatively more complex optical flow image registration technique may be employed as the first and second image registration techniques, respectively.

The techniques performed by the ARIS logic/module 140 can assist with improving the functionality and operations of the HDR image generation logic/module 150 used to generate HDR images. Computer functionality can be improved by enabling a system (e.g., system 100, etc.) to adaptively select a reference image and adaptively perform image registration techniques (based on the selection) to generate HDR images. These techniques of operating the system can, in turn, reduce or eliminate the need to apply de-ghosting algorithms to the generated HDR images, which can assist with reducing or eliminating wasted computational resources of the system (e.g., storage space of memory 160, processing power of unit(s) 130, computational time associated with device 120, memory 160, and/or unit(s) 130, etc.) and/or improving the processing speed/power of the system 100. It is to be appreciated that one or more of the ARIS logic/module 140 and the HDR generation logic/module 150 can be implemented in another system that differs from the system 100 (e.g., the logic/module 150 is implemented in processing unit(s) that are not part of the system 100, etc.).

As shown in FIG. 1, the system 100 can include memory 160 for storing and/or retrieving image data 170 and/or metadata 180 associated with the image data 170. The image data 170 and/or the metadata 180 can be processed and/or captured by the other components of the system 100 (e.g., the imaging device 120 as described above). Furthermore, other data (e.g., data captured by, processed by, and/or associated with at least one of processing unit(s) 130, peripheral(s) 190, and/or the imaging device 120, etc.) can be stored to and/or retrieved from the memory 160. The system 100 can also include a memory controller (not shown), which includes at least one electronic circuit that manages data flowing to and/or from the memory 160. The memory controller can be a separate processing unit or integrated as part of processing unit(s) 130. As explained above, one or more of the logic/modules 140 and 150 may be implemented as software (e.g., one or more instructions of a computer program executed by the processing unit(s) 130). For this embodiment, such software may be stored in the memory 160.

The system 100 can include an imaging device 120 that includes at least one of an imaging sensor, a lens assembly, or camera circuitry for capturing images—e.g., a bracket comprised an EV0 image and an EV− image. For one embodiment, the imaging device 120 can include any known imaging component that enables image capture operations. For one embodiment, when the imaging device 120 includes a display device (e.g., a screen), the imaging device 120 can include a front-facing imaging device and/or a rear-facing imaging device. For this embodiment, the front-facing imaging device observes a scene in the same direction that the display device faces, while the rear-facing imaging device observes a scene in a direction that is different from the direction faced by the display device. Image sensor(s) of the device 120 can, for example, include a charge-coupled device (CCD) or complementary metal oxide semiconductor (CMOS) sensor. Imaging device 120 can also include an image signal processing (ISP) pipeline that is implemented as specialized hardware, software, or a combination of both. The ISP pipeline can perform one or more operations on raw images (also known as raw image files) received from image sensor(s) of the device 120. The ISP pipeline can also provide the processed image data to the memory 160, the optional peripheral(s) 190, and/or the processing unit(s) 130.

The system 100 can also include peripheral(s) 190. For one embodiment, the peripheral(s) 190 can include at least one of the following: (i) one or more input devices that interact with or send data to one or more components of the system 100 (e.g., mouse, keyboards, etc.); (ii) one or more output devices that provide output from one or more components of the system 100 (e.g., monitors, printers, display devices, etc.); or (iii) one or more storage devices that store data in addition to the memory 160. The peripheral(s) 190 may combine different devices into a single hardware component that can be used both as an input and output device (e.g., a touchscreen, etc.). The peripheral(s) 190 can also be referred to as input/output (I/O) devices 190 throughout this document. The system 100 can also include at least one peripheral control circuit (not shown), which can be a controller (e.g., a chip, an expansion card, or a stand-alone device, etc.) that interfaces with and is used to direct operation(s) of the peripheral(s) 190. The peripheral(s) controller can be a separate processing unit or integrated as one of the processing unit(s) 130.

The system 100 can include sensor(s) 191. For one embodiment, the sensor(s) 191 may include at least one sensor whose purpose is to detect a characteristic of one or more environs. For one embodiment, the sensor(s) 191 can be used to detect one or more environs associated with capturing and/or processing images—for example, one or more sensors for detecting motion during capturing or processing of an image, one or more sensors for detecting lighting conditions, etc. Examples of such sensors include, but are not limited to, an accelerometer, a proximity sensor, a vibration sensor, a gyroscopic sensor, a voltage sensor, a current sensor, a resistance sensor, a refraction sensor, a reflection sensor, a rotation sensor, a velocity sensor, an inclinometer, and a momentum sensor.

For one embodiment, the system 100 includes a communication mechanism 110. The communication mechanism 110 can be a bus, a network, or a switch. When the communication mechanism 110 is a bus, the communication mechanism 110 is a communication system that transfers data between components of system 100, or between components of system 100 and other components of other systems (not shown). As a bus, the communication mechanism 110 includes all related hardware components (wire, optical fiber, etc.) and/or software, including communication protocols. For one embodiment, the communication mechanism 110 can include at least one of an internal bus or an external bus. Moreover, the communication mechanism 110 can include at least one of a control bus, an address bus, or a data bus for communications associated with the system 100. For one embodiment, the communication mechanism 110 can be a network or a switch. As a network, the communication mechanism 110 may be any type of network such as a local area network (LAN), a wide area network (WAN) such as the Internet, a fiber network, a storage network, or a combination thereof, wired or wireless. When the communication mechanism 110 is a network, the components of the system 100 do not have to be physically located next to each other. When the mechanism 110 is a switch (e.g., a "cross-bar" switch), separate components of system 100 may be linked directly over a network even though these components may not be physically located next to each other. For example, at least two of the processing unit(s) 130, the communication mechanism 110, the memory 160, the peripheral(s) 190, the imaging device 120, or the sensor(s) 191 are in distinct physical locations from each other and are communicatively coupled via the communication mechanism 110, which is a network or a switch that directly links these components over a network.

For one embodiment, one or more components of the system 100 may be implemented as one or more integrated circuits (ICs). For example, at least one of the processing unit(s) 130, the communication mechanism 110, the imaging device 120, the peripheral(s) 190, the sensor(s) 191, or the memory 160 can be implemented as a system-on-a-chip (SoC) IC, a three-dimensional (3D) IC, any other known IC, or any known combination of ICs. For another embodiment, two or more of components of the system 100 are implemented together as one or more ICs. For example, at least two of the processing unit(s) 130, the communication mechanism 110, the memory 160, the peripheral(s) 190, the imaging device 120, or the sensor(s) 191 are implemented together as a single SoC IC.

Figure 2:
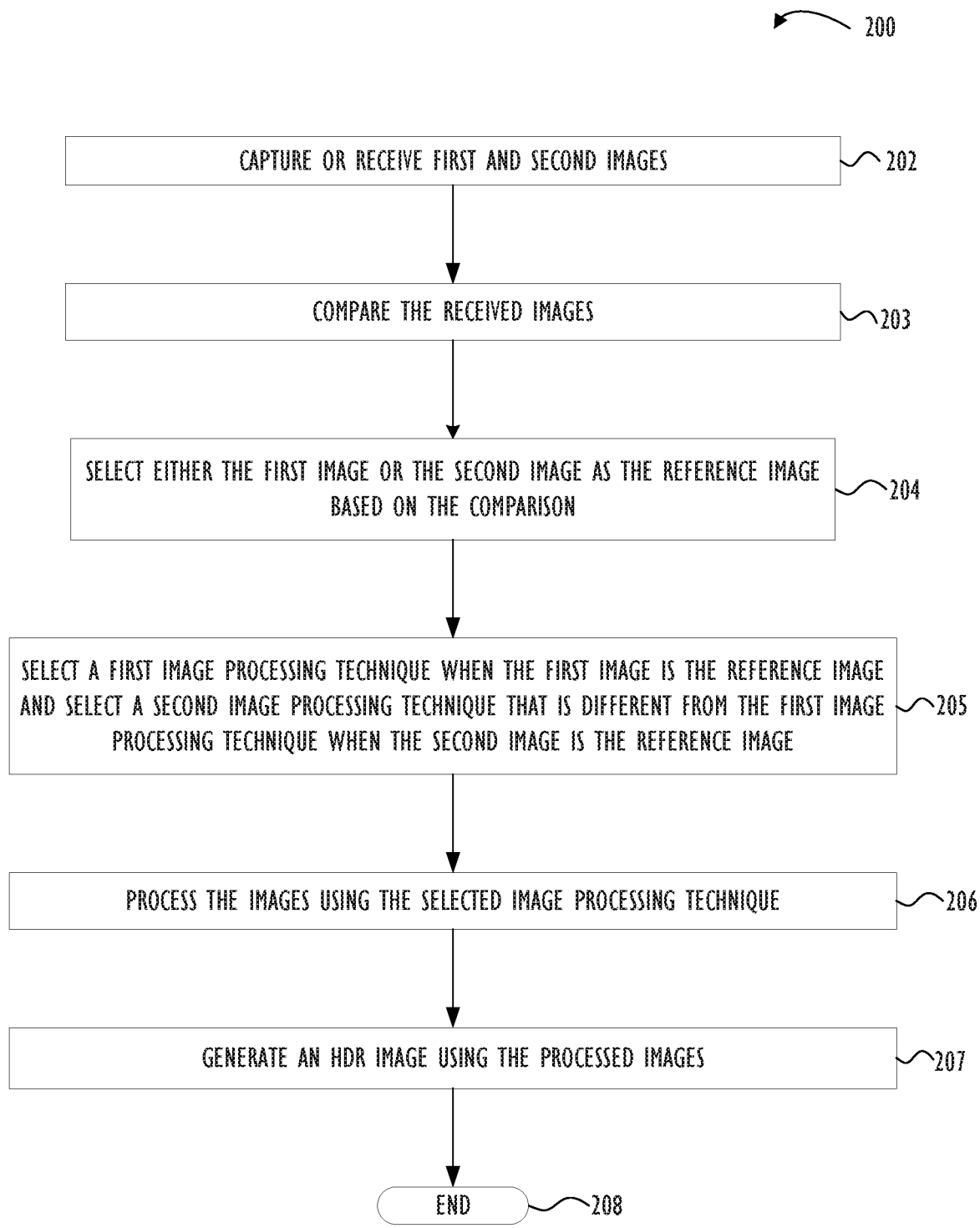
FIG. 2 is a flowchart representing an embodiment of a process of performing a technique of reducing or eliminating artifact pixels in HDR imaging.

Referring now to FIG. 2, which illustrates a flowchart representing an embodiment of a process 200 of performing a technique of reducing or eliminating artifact pixels in HDR imaging. The process 200 can be performed by one or more components of the system 100 of FIG. 1 (e.g., the ARIS logic/module 140, the HDR image generation logic/module 150, etc.). For brevity, the process 200 will be described as being performed by the ARIS logic/module 140. It is to be appreciated, however, that the process 200 can be performed more than just the ARIS logic/module 140. For example, the process 200 may be performed by the ARIS logic/module 140 and the HDR image generation logic/module 150.

The process 200 begins at a block 202, where the ARIS logic/module 140 receives first and second images. In the process 200, the first image is the EV0 image and the second image is the EV− image. For one embodiment, the ARIS logic/module 140 directs an imaging device (e.g., the imaging device 120 described above in connection with FIG. 1, etc.) to capture the first and second images. In some instances, the ARIS logic/module 140 obtains the first and second images from memory (e.g., the memory 160 described above in connection with FIG. 1). The first image (i.e., the EV0 image) and the second image (i.e., the EV− image) can be part of a bracket. For one embodiment, the bracket is obtained or captured according to at least one of the descriptions provided above in connection with FIG. 1.

Next, at a block 203 of the process 200, the ARIS logic/module 140 compares the first image (i.e., the EV0 image) to the second image (i.e., the EV− image). This comparison may include the ARIS logic/module 140 identifying pixels in the EV0/EV− image pair as potential artifact pixels and determining whether a total number of the potential artifact pixels has a predetermined relationship with a threshold count value, as described above in connection with FIG. 1.

The process 200 also includes a block 204. Here, the ARIS logic/module 140 selects either the first image (i.e., the EV0 image) or the second image (i.e., the EV− image) based on the comparison performed in the block 203. For example, the ARIS logic/module 140 selects the first image (i.e., the EV0 image) as the reference image when the comparison performed by the ARIS logic/module 140 in the block 203 indicates that a total number of the potential artifact pixels in the EV0/EV− image pair fails to meet or exceed a threshold count value. For this example, the ARIS logic/module 140 selects the second image (i.e., the EV− image) as the reference image when the comparison performed by the ARIS logic/module 140 in the block 203 indicates that the total number of the potential artifact pixels in the EV0/EV− image pair meets or exceeds the threshold count value.

At a block 205 of the process 200, the ARIS logic/module 140 selects an image processing technique based on the selected reference image. For example, and as described above in connection with FIG. 1, the ARIS logic/module 140 may select one or more image registration techniques from among a first list of potential image registration techniques, e.g., an affine image registration technique and/or a single homograph image registration technique, when the first image (i.e., the EV0 image) is selected as the reference image. For this example, and as described above in connection with FIG. 1, the ARIS logic/module 140 may select one or more image registration technique from among a second list of potential image registration techniques, e.g., an optical flow image registration technique and/or a multiple homograph image registration technique, when the second image (i.e., the EV− image) is selected as the reference image.

The process 200 further includes a block 206, where the ARIS logic/module 140 processes the first image (i.e., the EV0 image) and the second image (i.e., the EV− image) using the selected image processing technique. For example, the ARIS logic/module 140 processes the first and second images (together with any other related images) based on the selected reference image and the selected image registration technique. At a block 207 of the process 200, the ARIS logic/module 140 may generate an HDR image using the processed images. For example, image fusing and warping operations may be performed using the processed images. The process 200 ends at a block 208.

Figure 3:
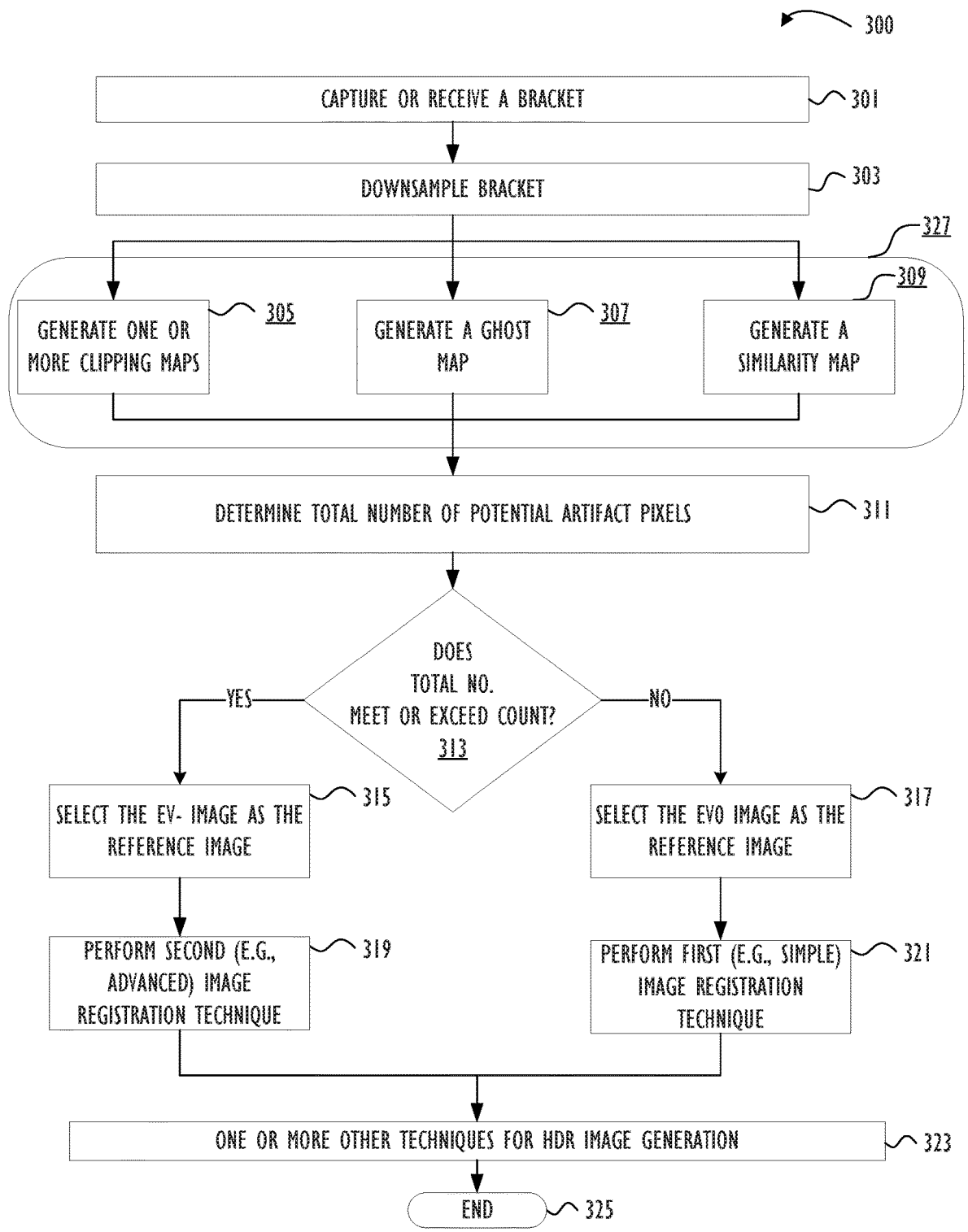
FIG. 3 is a flowchart representing another embodiment of a process of performing a technique of reducing or eliminating artifact pixels in HDR imaging.

Referring now to FIG. 3, which is a flowchart that represents one embodiment of a process 300 for reducing or eliminating artifacts in an HDR image. Process 300 can be performed by the ARIS logic/module 140 and the HDR image generation logic/module 150, both of which are described above in connection with FIGS. 1-2. Process 300 begins at block 301, where a bracket of images is obtained or captured. For one embodiment, the ARIS logic/module 140 directs an imaging device (e.g., the imaging device 120 described above in connection with FIG. 1, etc.) to capture the bracket. In some instances, the ARIS logic/module 140 obtains the bracket from memory (e.g., the memory 160 described above in connection with FIG. 1). The bracket can include at least an EV− image and an EV0 image. For one embodiment, the bracket is obtained or captured according to at least one of the descriptions provided above in connection with FIG. 1.

Next, at a block 303 of the process 300, the ARIS logic/module 140 downsamples the received EV0 and EV– images to generate lower quality versions of the images (e.g., thumbnails, etc.). As used herein, a "downsampled image" and its variants refer to an image that has been resized to a smaller size and/or a smaller resolution using one or more image scaling techniques. For one embodiment, the ARIS logic/module 140 downsamples each of the received EV0 and EV– images to 1.5625% of its original resolution (or (1/64) of its original resolution). Downsampling each of the EV0 and EV– images enables for faster and more noise-tolerant computation by the ARIS logic/module 140. For example, downsampling the EV0 and EV– images can assist with denoising the EV0 and EV– images. In this way, the ARIS logic/module 140 operates on the thumbnail versions of EV0 and EV– images instead of the original versions of the EV0 and EV– images, which can assist with making the ARIS logic/module 140 less sensitive to noise from the original versions of the EV0 and EV– images. Other embodiments, however, are not so limited. For example, each of the EV0 and EV– images may be downsampled at other ratios (e.g., 1%, 2%, 5%, any other percent, etc.). For yet another example, each of the EV0 and EV– images is not downsampled.

Figure 4A:
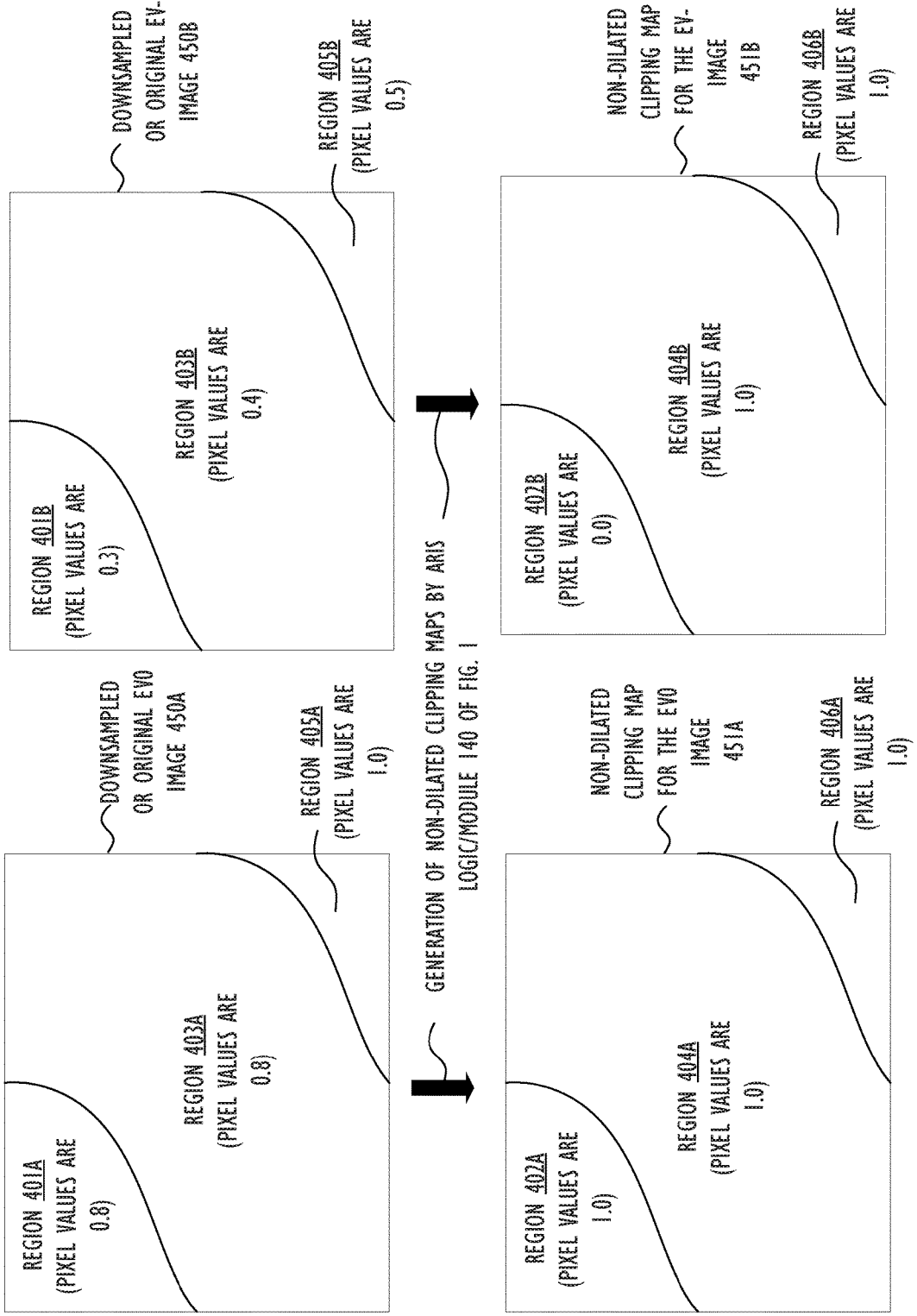

Referring briefly to FIG. 4A, which illustrates simplistic representations of the EV0 image as an image 450A and the EV– image as an image 450B. To avoid obscuring the concepts described herein, each of the images 450A-B includes pixel regions 401A-B, 403A-B, and 405A-B, respectively. For one embodiment, each of the pixel regions 401A-B, 403A-B, and 405A-B includes one or more pixels that each have the same pixel values. For example, the pixel region 401A may comprise multiple pixels that each have a pixel value of 0.8 (i.e., a pixel value that is 80% of the maximum pixel value). For this example, the pixel region 403A may comprise multiple pixels that each have a pixel value of 0.8 (i.e., a pixel value that is 80% of the maximum pixel value) and the pixel region 405A may comprise multiple pixels that each have a pixel value of 1.0 (i.e., a pixel value that is 100% of the maximum pixel value). Also, and for this example, the pixel region 401B may comprise multiple pixels that each have a pixel value of 0.3 (i.e., a pixel value that is 30% of the maximum pixel value), the pixel region 403B may comprise multiple pixels that each have a pixel value of 0.4 (i.e., a pixel value that is 40% of the maximum pixel value), and the pixel region 405B may comprise multiple pixels that each have a pixel value of 0.5 (i.e., a pixel value that is 50% of the maximum pixel value).

Returning now to FIG. 3, the process 300 includes block 327. Here, the ARIS logic/module 140 may identify pixels in the EV0/EV– image pair as potential artifact pixels. For one embodiment, and as shown in FIG. 3, this identification of potential artifact pixels is achieved by the ARIS logic/module 140 performing blocks 305, 307, and 309. That is, the ARIS logic/module 140 may compute one or more maps using the thumbnail or original versions of the EV0 and EV– images. Other embodiments, however, are not so limited. For example, the ARIS logic/module 140 identifies potential artifact pixels in the EV0/EV– image pair based on one or more descriptions provided above in connection with FIG. 1.

For one embodiment, and with regard to the block 305 of the process 300, the ARIS logic/module 140 computes two non-dilated clipping maps (one for each of the EV0 and EV– images), one dilated clipping map for the EV– image, one ghost map based on an analysis of the clipping maps, and one similarity map based on a comparison of the EV0 and EV– images. For an alternate embodiment of the block 305 of the process 300, the ARIS logic/module 140 computes two non-dilated clipping maps (one for each of the EV0 and EV– images), two dilated clipping maps (one for each of the EV0 and EV– images), one ghost map based on analysis of the clipping maps, and one similarity map based on a comparison of the EV0 and EV– images.

The ARIS logic/module 140 may generate a non-dilated clipping map for the EV0 image and/or a non-dilated clipping map for the EV– image. For one embodiment, the ARIS logic/module 140 generates each of the non-dilated clipping maps by thresholding pixel values from EV0 and EV– images with a threshold pixel value. For example, and with regard to the EV0 image, the ARIS logic/module 140 generates the non-dilated clipping map by comparing each pixel value in the EV0 image with a threshold pixel value and setting a value for each pixel value based on the comparison. For this example, the value of the pixel is set at one or HIGH when the pixel value exceeds or is equal to threshold pixel value and the value of the pixel is set at zero or LOW when the pixel value is less than the threshold pixel value. The non-dilated clipping map is a collection of these ones/HIGHs and zeroes/LOWs. It is to be appreciated that the immediately preceding example applies to generating a non-dilated clipping map for the EV– image.

The threshold pixel value used for generating a non-dilated clipping map for the EV0 image may be set at, for example, 95% of the maximum pixel value, 90% of the maximum pixel value, 85% of the maximum pixel value, or any other percentage of the maximum pixel value, etc. The threshold pixel value used for generating a dilated clipping map may be a static pixel value. For example, the threshold pixel value may be a percentage of a predetermined, non-changing maximum pixel value. Alternatively, the threshold pixel value may be an adaptive pixel value. For example, an adaptive threshold pixel value is a percentage of a maximum pixel value that varies according to a scene's luminance. For this example, an auto-exposure technique that factors in scene luminance and is used for determining the exposure value at which the EV0 image is captured may be used to determine the maximum pixel value. It is be appreciated that the threshold pixel value used for generating the non-dilated clipping map for the EV– image may be different from the threshold pixel value used for generating the non-dilated clipping map for the EV0 image. For one embodiment, the threshold pixel value used for generating the non-dilated clipping map for the EV– image is equal to the result of dividing the threshold pixel value used for generating the non-dilated clipping map for the EV0 image by two to the power of the number of stops used for capturing the EV– image. For example, if the EV– image is captured at one stop below the EV0 image and the threshold pixel value set for the EV0 image is 80% of the maximum pixel value, then the threshold pixel value set for the EV– image will be 40% of the maximum pixel value (i.e., $0.4 = 0.8 \div (2^1)$).

Referring briefly again to FIG. 4A, which illustrates simplistic representations of the non-dilated clipping map 451A for the EV0 image 450A and the non-dilated clipping map 451B for the EV– image 450B. As explained above, the value of the pixel is set at one or HIGH when the pixel value exceeds or is equal to threshold pixel value and the value of the pixel is set at zero or LOW when the pixel value is less than the threshold pixel value. For example, and with regard to FIG. 4A, if the threshold pixel value is represented as 0.8, then each pixel in the regions 402A, 404A, and 406A will be set to a value of one or HIGH in the map 451A. For this example, if the EV– image is captured at one stop below the EV0 image, then the region 402B will be set at 0 or LOW and each of the regions 404B, and 406B will be set to a value of one or HIGH in the map 451B. For the example in FIG. 4A, the threshold pixel value set for the EV− image will be 40% of the maximum pixel value (i.e., $0.4=0.8 \div (2^1)$).

Returning to FIG. 3, the ARIS logic/module 140 may generate a dilated clipping map for the EV0 image and/or a dilated clipping map for the EV− image after generating the non-dilated clipping map(s), as shown in the block 305 of the process 300. For one embodiment of the block 305, the ARIS logic/module 140 generates a dilated clipping map for the EV− image without generating a dilated clipping map for the EV0 image.

The ARIS logic/module 140 generates an image's dilated clipping map using the image's non-dilated clipping map. For example, and with regard to the EV− image, the ARIS logic/module 140 generates the EV− image's dilated clipping map by dilating (i.e., expanding) the EV− image's non-dilated clipping map to include the surrounding pixels of the clipping region(s) in the EV− image. The additional pixels can be any number of pixels—e.g., one pixel, two pixels, etc. One reason for generating the dilated clipping map for the EV− image is that the dilated clipping map increases the likelihood that all pixels lacking complete information (e.g., clipped pixels, etc.) in the EV0 and/or EV− images are selected as pixels that may be potential artifact pixels. Even though some embodiments do not require a dilated clipping map for the EV0 image, it is to be appreciated that the immediately preceding example applies to generating a dilated clipping map for the EV0 image.

Referring briefly to FIG. 4B, which illustrates a simplistic representation of the dilated clipping map 451C for the EV− image 450B that is based on the non-dilated clipping map 451B. As explained above, the ARIS logic/module 140 generates the EV− image's dilated clipping map by dilating (i.e., expanding) the EV− image's non-dilated clipping map to include the surrounding pixels of the clipping region(s) in the EV− image. For example, and with regard to FIG. 4B, this dilation operation includes adjusting region 404B's boundary by moving it from the old boundary 498 to the new boundary 499. It is to be appreciated that this dilation is not performed on region 406B because it is at the edge of the image and it borders the region 404B, which has been identified as a clipping region. It is also to be appreciated that this dilation is not performed on region 402B because it was not identified as a clipping region. It is also to be appreciated that the number pixels used for determining the new boundary 499 can be any number of pixels from the old boundary 498.

Returning again to FIG. 3, the ARIS logic/module 140 may generate a ghost map based on an analysis of the generated clipping maps as shown in the block 307 of the process 300. For one embodiment, the ghost map is used to flag or identify corresponding pixel regions of the EV0 and EV− images that may potentially result in an artifact after registration and fusion techniques are performed on the EV0 and EV− image. For one embodiment, the ARIS logic/module 140 generates the ghost map based on a comparison of the non-dilated clipping map for the EV0 image and the non-dilated clipping map for the EV− image. Here, the ghost map only includes information identifying one or more pixel regions where the pixel information found in the two non-clipping maps differ. In other words, the ghost map identifies at least one pixel region that includes a pixel with incomplete information in one of the two images (e.g., a clipped pixel in the EV− image, etc.), where the identified pixel corresponds to a pixel in the other image that has complete information (e.g., a non-clipped pixel in the EV0 image, etc.). This difference may include differences in brightness or luminance values of the compared pixels. For example, the ghost map may show that a pixel is clipped in the EV− image but not in the EV0 image (and vice versa). For this example, if a pixel is in a clipping region in the EV− image (i.e., its pixel value exceeds the threshold pixel value), then a corresponding pixel in the EV0 image should have a pixel value that is also larger than the threshold pixel value. If not, the ghost map will identify this difference, which may be flagged or identified as a pair of corresponding pixels that may potentially result in an artifact after registration and fusion techniques are performed on the EV0 and EV− image.

For one embodiment, the ghost map may include a value of one or HIGH for a region defined by the non-dilated map of EV0 image that includes at least one pixel with incomplete information and a corresponding region defined by the non-dilated map for EV− image that includes at least one pixel with complete information (and vice versa). For another embodiment, the ghost map may include a value of zero or LOW for a region defined by the non-dilated map for EV0 image that includes at least one pixel with incomplete information and a corresponding region defined by the non-dilated map for EV− image that includes at least one pixel with incomplete information. For yet another embodiment, the ghost map may include a value of zero or LOW for a region defined by the non-dilated map for EV0 image that includes at least one pixel with complete information and a corresponding region defined by the non-dilated map for EV− image that includes at least one pixel with complete information.

Figure 4C:
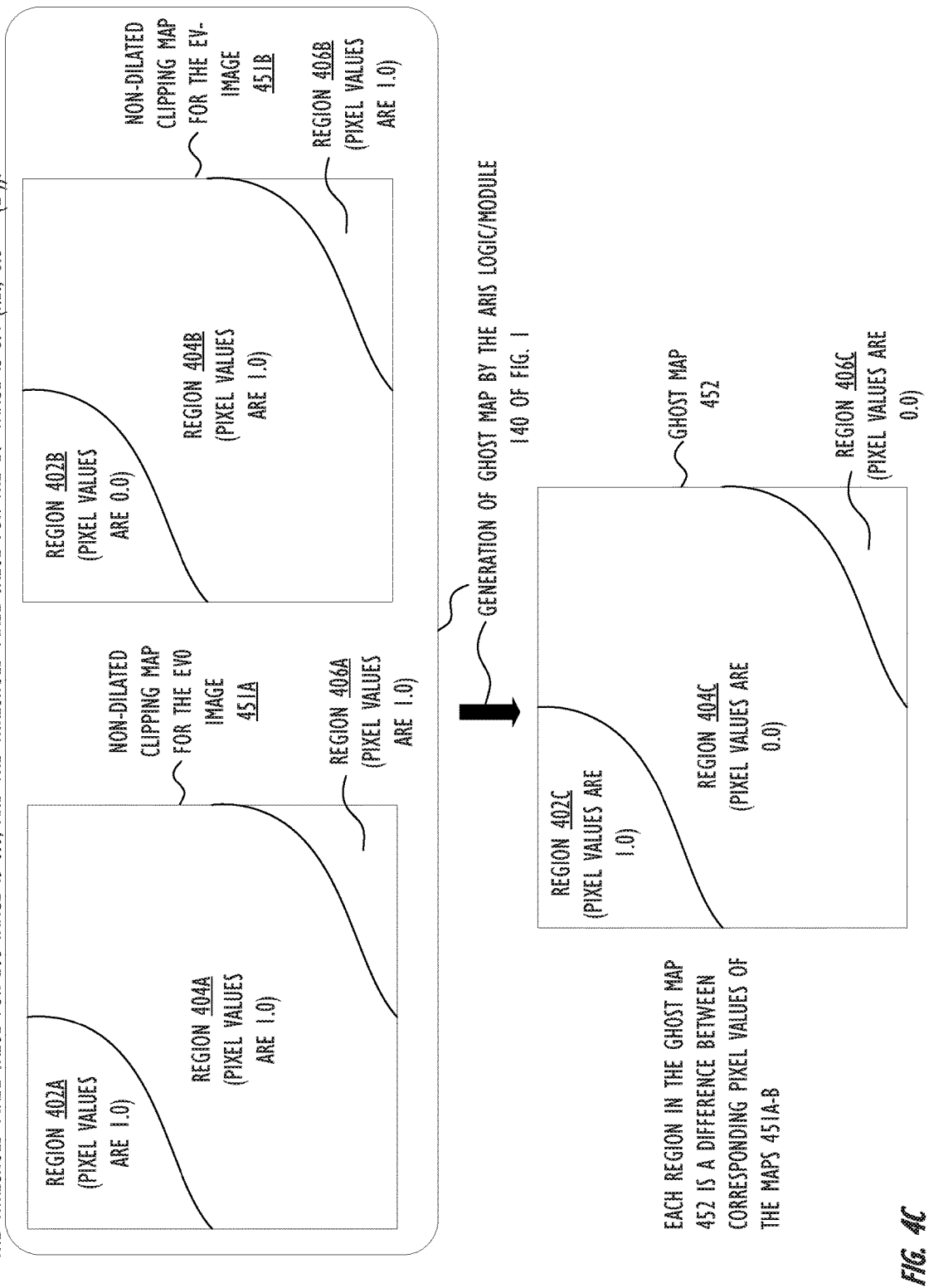

Referring briefly to FIG. 4C, which illustrates a simplistic representation of a ghost map 452. As explained above, the ARIS logic/module 140 generates the ghost map to include only information identifying one or more pixel regions where the pixel information found in the two non-clipping maps differ. For example, and with regard to FIG. 4C, each pixel in the pixel region 402C is assigned a value of one or HIGH because the pixels in regions 402A-B of the maps 451A-B have differing values. For this example, regions 404C and 406C are each assigned a value of zero or LOW because their corresponding regions in the non-dilated clipping maps 451A-B are equal.

Returning now to FIG. 3, the ARIS logic/module 140 may also generate a similarity map based on a comparison of the EV0 and EV− images (as shown in block 309 of the process 300). The similarity map may be based on a comparison of the thumbnail or original versions of EV0 and EV− images. For one embodiment, the ARIS logic/module 140 generates the similarity map as follows: (i) scale the EV0 image using a predetermined scaling factor (e.g., 0.5, 0.75, any other scaling factor, etc.); (ii) compute differences between each pair of corresponding regions of the scaled EV0 image and the EV− image; and (iii) compute similarities between each pair of corresponding regions of the scaled EV0 image and the EV− image using the computed differences.

For one embodiment, the scaling factor used for scaling the EV0 image is based on the number of stops used for capturing the EV− image. For example, if the EV− image is captured at n lower stops than the EV0 image, then a scaling factor of $$\left(\frac{1}{2^{(n)}}\right)$$

is used.

Figure 4D:
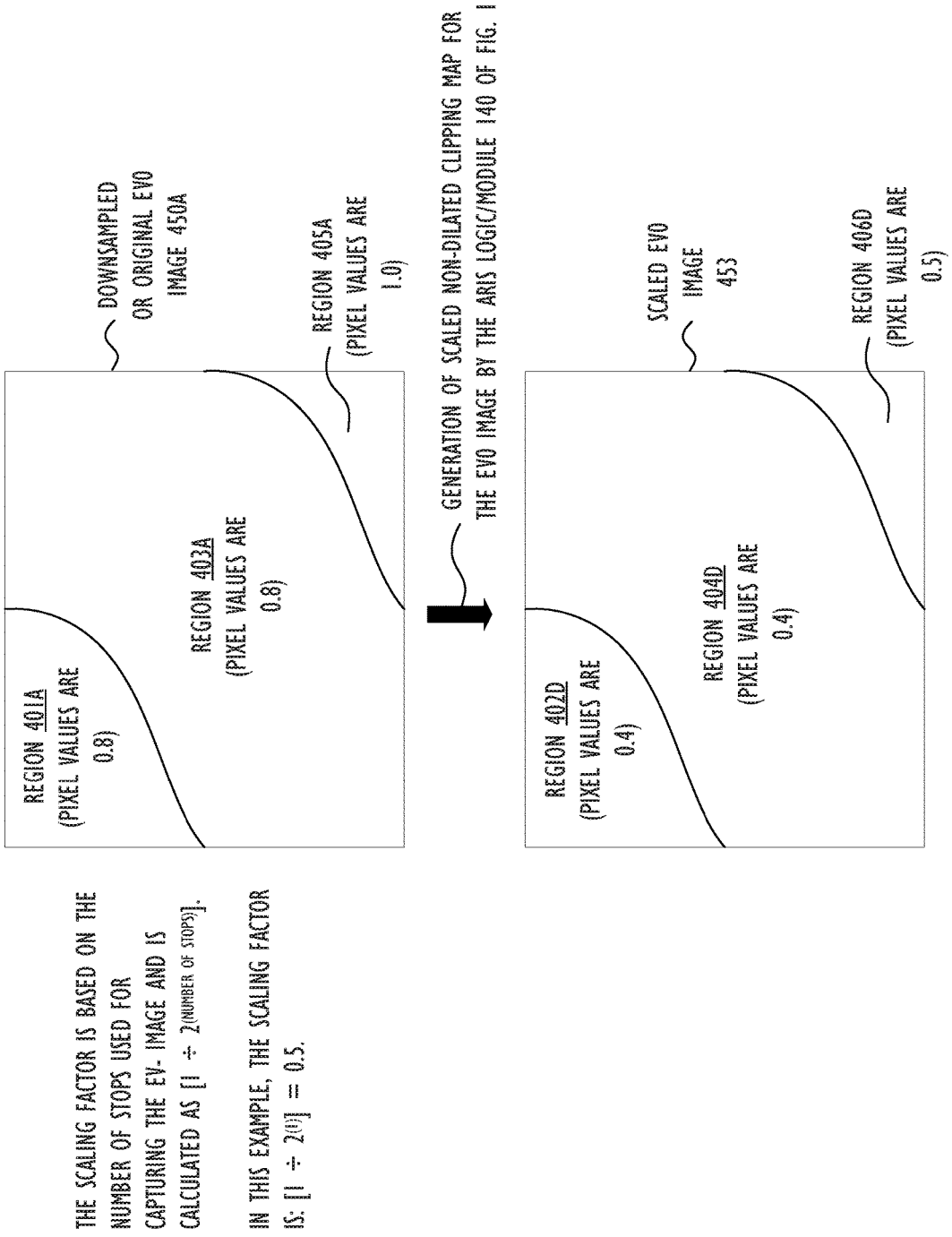

Referring briefly to FIG. 4D, which illustrates a simplistic representation of a scaled EV0 image 453. For one embodiment, the ARIS logic/module 140 generates the scaled EV0 image 453 by scaling each pixel in the EV0 image 450A. That is, each pixel value is multiplied by the scaling factor to determine the scaled pixel's value. For example, and with regard to FIG. 4D, the EV− image is captured at one stop below the EV0 image. Thus, the scaling factor is 0.5 (i.e., $0.5=(1÷2^1)$). For this example, the scaling operation includes each pixel in region 402D being assigned a pixel value of 0.4 (i.e., 0.4=0.8×0.5), each pixel in region 404D being assigned a pixel value of 0.4 (i.e., 0.4=0.8×0.5), and each pixel in region 406D being assigned a pixel value of 0.5 (i.e., 0.5=1.0×0.5).

Generating the similarity map also includes the ARIS logic/module 140 computing differences between each pair of corresponding pixels in the scaled EV0 image and the EV− image. A difference between a pair of corresponding pixels may be computed as follows:

$$\text{Difference}=|(\text{Pixel}_{ScaledEV0}-\text{Pixel}_{EV-})|,$$

where "$\text{Pixel}_{ScaledEV0}$" is a value representing a pixel value assigned to a pixel in a pixel region of the scaled EV0 image as a proportion of the maximum pixel value;

where "$\text{Pixel}_{EV-}$" is a value representing a pixel value assigned to a pixel in a pixel region of the EV− image as a proportion of the maximum pixel value; and where "$\text{Pixel}_{ScaledEV0}$" and "$\text{Pixel}_{EV-}$" are corresponding pixels in corresponding pixel regions in the EV0 and EV− images.

Figure 4E:
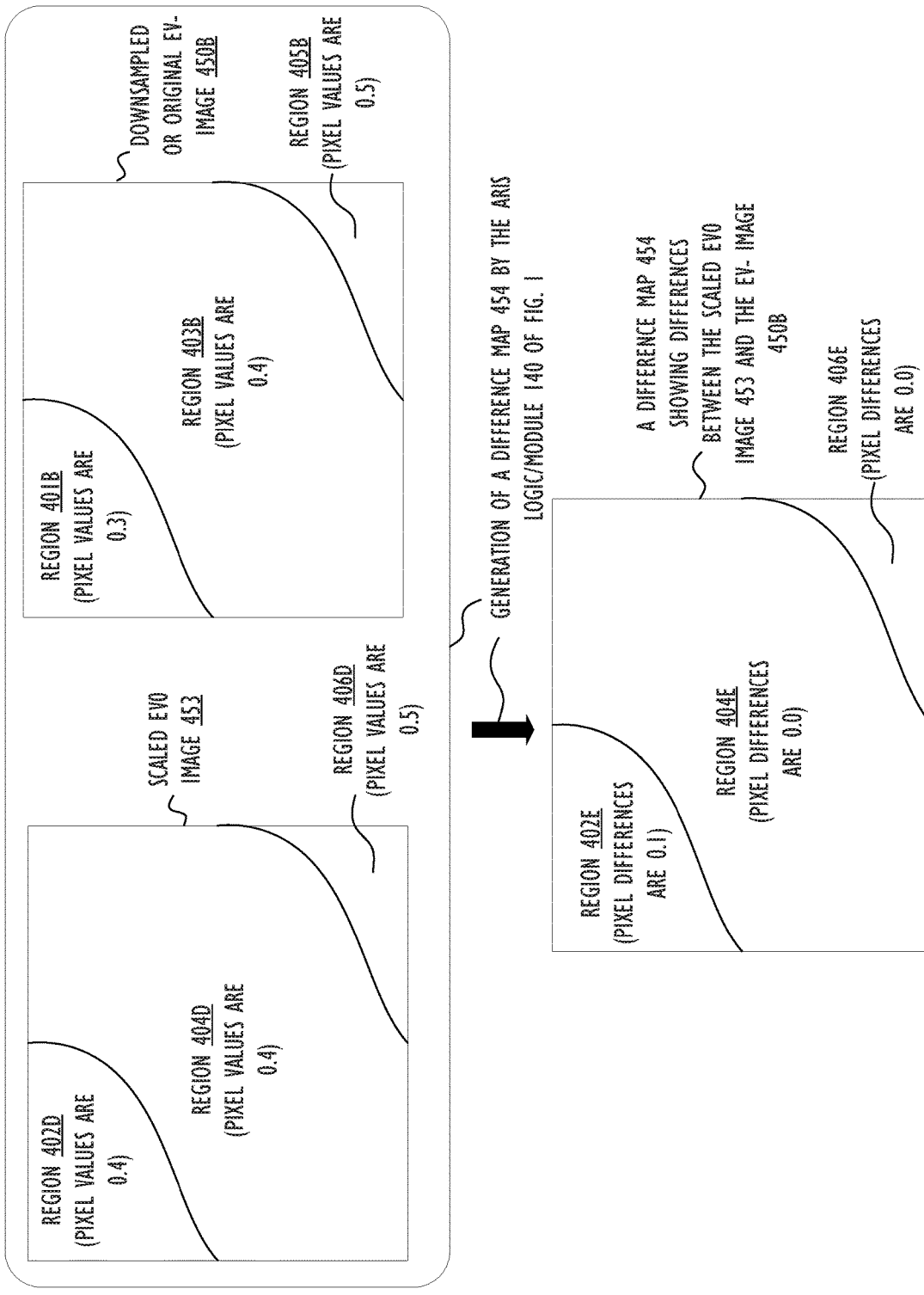

Referring briefly to FIG. 4E, which illustrates a simplistic representation of the computed a difference map 454 that includes differences between corresponding pixels of the scaled EV0 image 453 and the EV− image 450B. For example, and with regard to FIG. 4E, each pair of corresponding pixels in the pixel region 402E has a pixel difference of 0.1 (i.e., 0.1=|0.4−0.3|), each pair of corresponding pixels in the pixel region 404E has a pixel difference of 0.0 (i.e., 0.0=|0.4−0.4|), and each pair of corresponding pixels in the pixel region 406E has a pixel difference of 0.0 (i.e., 0.0=|0.5−0.5|).

Returning again to FIG. 3, generating a similarity map at block 309 of the process 300 includes the ARIS logic/module 140 computing similarities between each pair of corresponding pixels from corresponding pixels regions in the scaled EV0 image and the EV− image using the computed differences described above. A similarity between a pair of corresponding pixels from corresponding regions in the scaled EV0 image and the EV− image may be computed as follows:

$$\text{Similarity}=|(1.0-\text{Difference})|$$

Figure 4F:
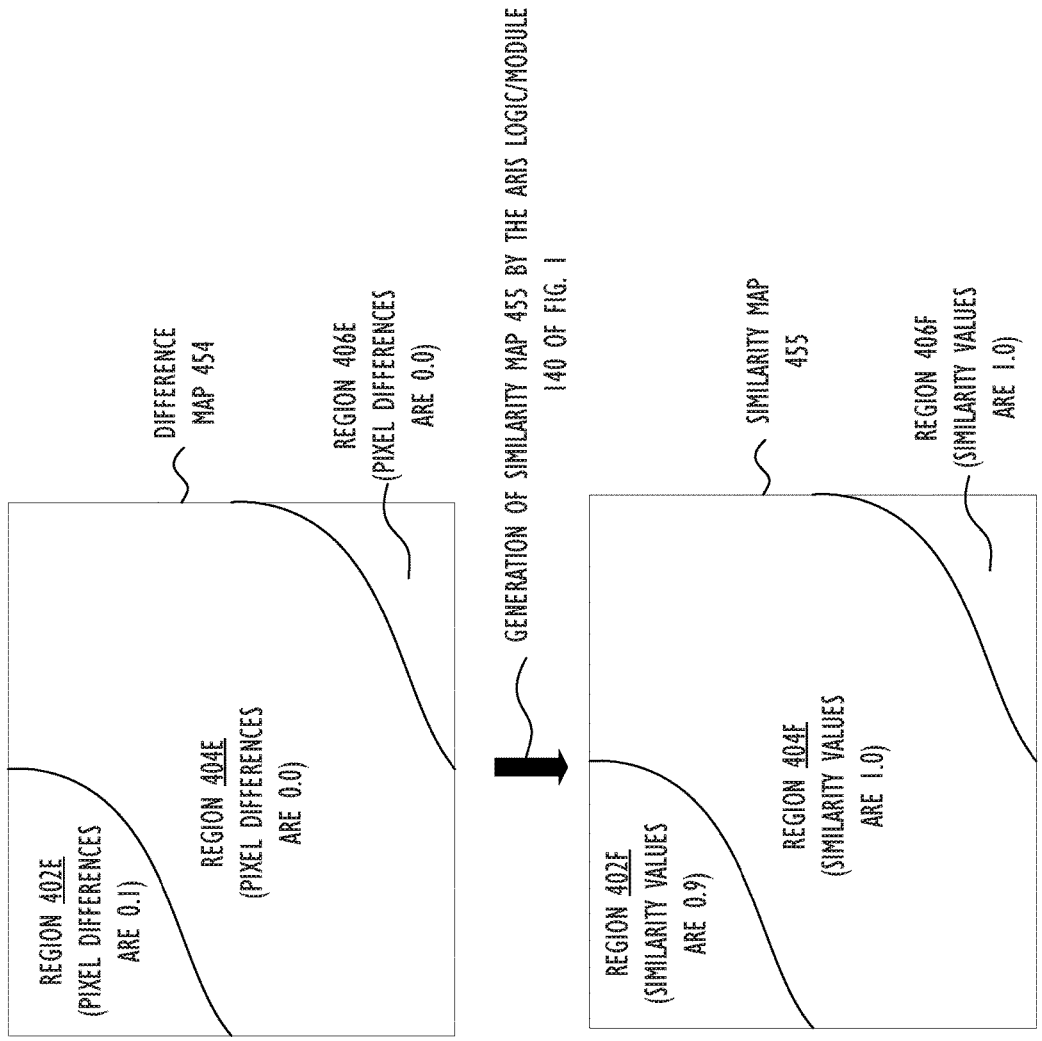

Referring briefly to FIG. 4F, which illustrates a simplistic representation of a similarity map 455. For example, and with regard to FIG. 4F, each pair of corresponding pixels from the pixel region 402F has a similarity value 0.9 (i.e., 0.9=|1.0−0.1|). That is, each pixel in a pair of corresponding pixels from the pixel region 402F is 90% similar to the other pixel in the pair. Also, and with regard to the example in FIG. 4F, each pair of corresponding pixels from each of the pixel regions 404F and 406F has a similarity value of 1.0 (i.e., 1.0=|1.0−0.0|). That is, each pixel in a pair of corresponding pixels from the pixel regions 404F or 406F is 100% similar to the other pixel in the pair.

Returning now to FIG. 3, the ARIS logic/module 140 may determine the total number of potential artifact pixels in the EV0/EV− image pair using the clipping maps, the ghost map, and the similarity map (as shown in block 311 of the process 300). For one embodiment, the ARIS logic/module 140 performs block 311 as follows: (i) determine that a pixel's value from the dilated EV− clipping map exceeds a first threshold (e.g., the pixel's value is greater than 0.5, the pixel's value is HIGH, etc.); (ii) determine that a pixel's value from the ghost map exceeds a second threshold (e.g., the pixel's value is greater than 0.5, the pixel's value is HIGH, etc.); and (iii) determine, based on the similarity map, that a similarity between the pixel and a corresponding pixel of the EV0 image is less than a third threshold similarity value (e.g., the pixel's similarity value is less than 0.95, etc.). In response to the ARIS logic/module 140 determining that all three determinations are true, the ARIS logic/module 140 will assign the pixel a value of one or HIGH to indicate that the pixel is a potential artifact pixel. When the ARIS logic/module 140 determines that any one of the three determinations is false, the ARIS logic/module 140 will assign the pixel a value of zero or LOW to indicate that the pixel is not a potential artifact pixel. For another embodiment, the ARIS logic/module 140 performs block 311 as described above using the dilated EV0 clipping map instead of the dilated EV− clipping map. Thus, for this embodiment, block 311 is performed as follows: (i) determine that a pixel's value from the dilated EV0 clipping map exceeds a first threshold (e.g., the pixel's value is greater than 0.5, the pixel's value is HIGH, etc.); (ii) determine that a pixel's value from the ghost map exceeds a second threshold (e.g., the pixel's value is greater than 0.5, the pixel's value is HIGH, etc.); and (iii) determine, based on the similarity map, that a similarity between the pixel and a corresponding pixel of the EV0 image is less than a third threshold similarity value (e.g., the pixel's similarity value is less than 0.95, etc.). In response to the ARIS logic/module 140 determining that all three determinations are true, the ARIS logic/module 140 will assign the pixel a value of one or HIGH to indicate that the pixel is a potential artifact pixel. When the ARIS logic/module 140 determines that any one of the three determinations is false, the ARIS logic/module 140 will assign the pixel a value of zero or LOW to indicate that the pixel is not a potential artifact pixel.

After the block 311, the process 300 proceeds to a decision block 313. Here, the ARIS logic/module 140 may determine whether the total number of potential artifact pixels in the EV0/EV− image pair has a predetermined relationship with an artifact pixel count threshold. If the total number of potential artifact pixels meets or exceeds the artifact pixel count threshold, the ARIS logic/module 140 selects the EV− image as the reference image for image registration and image fusion techniques (as shown in block 315). Alternatively, the ARIS logic/module 140 selects the EV0 image as the reference image for image registration and image fusion techniques when the total number of potential artifact pixels fails to reach the count threshold (as shown in block 317).

The process 300 proceeds to block 321 when the reference image is the EV0 image. Here, the HDR image generation logic/module 150 receives the bracket with information identifying the selected reference image and selects one or more image registration techniques from among a first list of potential image registration techniques, which may, according to some embodiments, comprise a list of relatively "simple" image registration techniques (i.e., simple, relative to the image registration techniques in the other list), to perform on the bracket. Alternatively, the process 300 proceeds to block 319 when the reference image is the EV− image. Here, the HDR image generation logic/module 150 receives the bracket with information identifying the selected reference image and selects one or more image registration techniques from among a second list of potential image registration techniques, which may, according to some embodiments, comprise a list of "advanced" image registration techniques, to perform on the bracket. Various examples of advanced and simple image registration techniques are described above in connection with FIG. 1. For one embodiment, each of the blocks 319 and 321 is performed according to some or all of the descriptions provided above in connection with FIGS. 1-2.

Process 300 also includes block 323, where the HDR image generation logic/module 150 can perform one or more additional techniques used for generating an HDR image from the bracket. Examples of such techniques include, but are not limited to image fusion techniques and application of tone mapping curves/operators. Process 300 ends at block 325.

Each of the embodiments described herein in connection with FIGS. 1-4F can be combined with one or more face detection algorithms, one or more foreground/background detection algorithms, and/or one or more object detection algorithms. For a first example, and for one embodiment, a weighting scheme can be used in one or more of the embodiments described herein in connection with FIGS. 1-4F where, for example, a potential artifact pixel in a detected foreground or foreground object (e.g., a face, etc.) can be assigned a first weight that is higher than a second weight assigned to a potential artifact pixel in a background or background object (e.g., a scenery behind a face, etc.). For this example, all other potential artifact pixels (i.e., potential artifact pixels that are not part of a foreground or a background) are assigned a third weight that is different from the first and second weights. The third weight may, for example, be between the first and second weights. Also, and for this example, one or more of the thresholds used for determining the potential artifact pixels can be weighted such that the likelihood that all artifact pixels in an area or object of interest (e.g., a foreground, a foreground object, etc.) are identified is increased. For this example, all the weighted artifact scores may be summed together to obtain a total weighted potential artifact pixel count for the image. For a second example, and for one embodiment, if the potential artifact pixels are identified as being part of a detected object (e.g., a face, etc.) in an image and a total number of these potential artifact pixels exceeds a threshold count, the process of identifying artifact pixels (as described herein in connection with any one of FIGS. 1-4F) can be restarted with lower thresholds for the detected object to increase the likelihood that all artifact pixels are identified in the detected object. For a third example, and for one embodiment, multiple thresholds can be used for determining potential artifact pixels in an image. For this third example, a first set of thresholds can be used for determining potential artifact pixels in a detected background of an image and a second, higher set of thresholds can be used for determining potential artifact pixels in a detected foreground of an image or a detected object of interest (e.g., a face, an animal, a scene, a landmark, a building, etc.).

Figure 5:
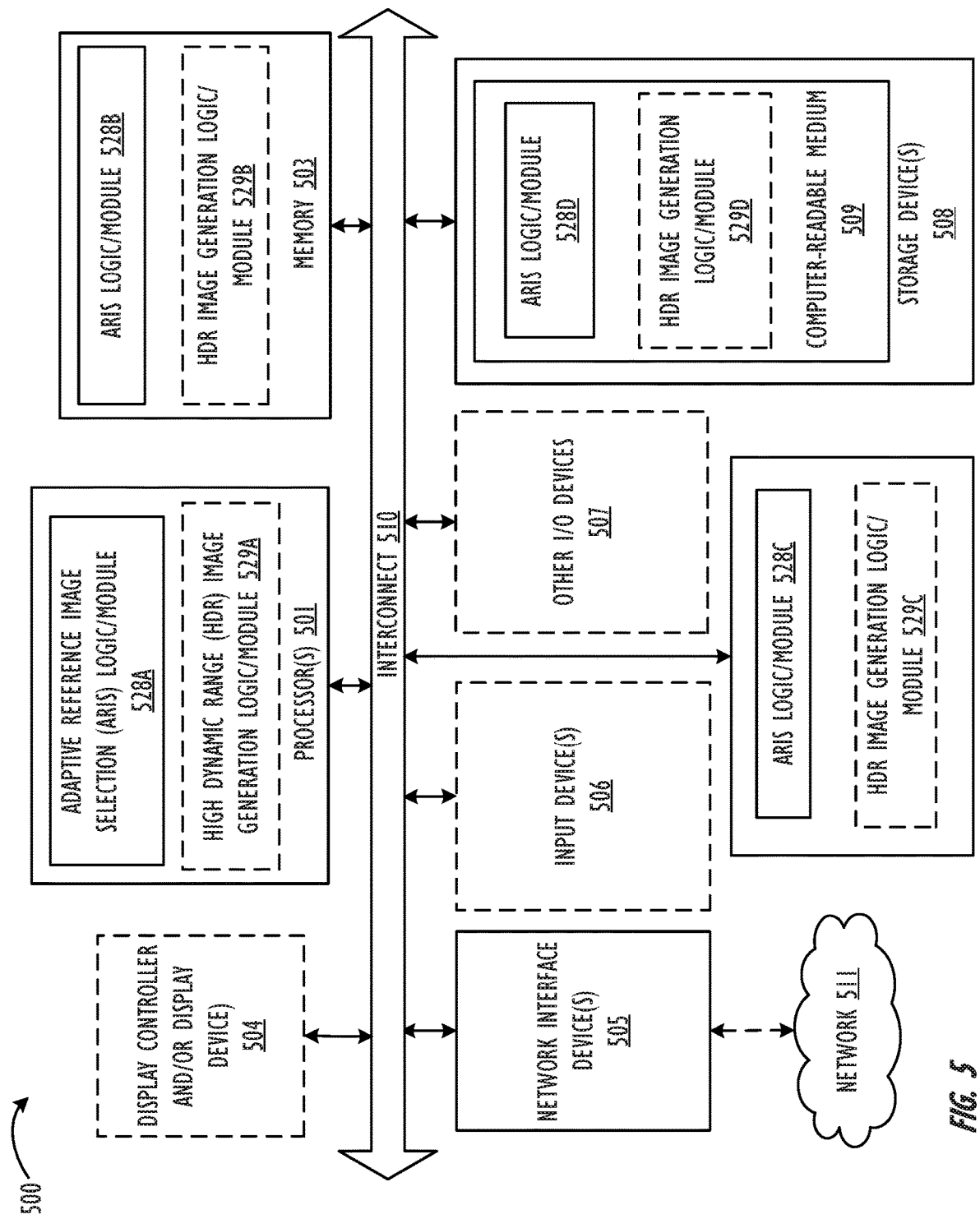
FIG. 5 illustrates an exemplary processing system that can assist with performing a technique of reducing or eliminating artifact pixels in HDR imaging according to one or more of the embodiments described herein.

FIG. 5 is a block diagram illustrating an example of a data processing system 500 that may be used with one embodiment. For example, the system 500 may represent any of the data processing systems described above performing any of the processes or methods described above in connection with at least one of FIG. 1, 2, 3, or 4A-4F.

System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high-level view of many components of the computer system. Nevertheless, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute at least one set of instructions to perform any of the methodologies discussed herein.

For one embodiment, system 500 includes processor(s) 501, memory 503, and devices 505-508 via a bus or an interconnect 510. Processor(s) 501 may represent a single processor or multiple processors with a single processor core or multiple processor cores included therein. Processor(s) 501 may represent one or more general-purpose processors such as a microprocessor, a central processing unit (CPU), or the like. More particularly, processor(s) 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor(s) 501 may also be one or more special-purpose processors such as an application specific integrated circuit (ASIC), an application-specific instruction set processor (ASIP), a cellular or baseband processor, a field programmable gate array (FPGA), a digital signal processor (DSP), a physics processing unit (PPU), an image processor, an audio processor, a network processor, a graphics processor, a graphics processing unit (GPU), a network processor, a communications processor, a cryptographic processor, a co-processor, an embedded processor, a floating-point unit (FPU), or any other type of logic capable of processing instructions.

Processor(s) 501, which may be a low power multi-core processor socket such as an ultra-low voltage processor, may act as a main processing unit and central hub for communication with the various components of the system. Such processor can be implemented as a system-on-chip (SoC) IC. At least one of ARIS logic/module 528A or HDR image generation logic/module 529A may reside, completely or at least partially, within processor(s) 501. Furthermore, the processor(s) 501 is configured to execute instructions for performing the operations and methodologies discussed herein—for example, any of the processes or methods described above in connection with at least one of FIG. 1, 2, 3, or 4A-4F. System 500 may further include a graphics interface that communicates with optional graphics subsystem 504, which may include a display controller, a graphics processing unit (GPU), and/or a display device. For one embodiment, the processor(s) 501 includes at least one of ARIS logic/module 528A or HDR image generation logic/module 529A, which enables processor(s) 501 to perform any, all, or some of the processes or methods described above in connection with at least one of FIG. 1, 2, 3, or 4A-4F.

Processor(s) 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor(s) 501 or any other device. For example, executable code and/or data of a variety of operating systems, device drivers, firmware (e.g., input output basic system or BIOS), and/or applications can be loaded in memory 503 and executed by processor(s) 501. An operating system can be any kind of operating system. An ARIS logic/module 528B and/or an HDR image generation logic/module 529B may also reside, completely or at least partially, within memory 503. For one embodiment, the memory 503 includes at least one of ARIS logic/module 528B or HDR image generation logic/module 529B, which are instructions. When the instructions represented by at least one of ARIS logic/module 528B or HDR image generation logic/module 529B are executed by the processor(s) 501, the instructions 528B and/or instructions 529B cause the processor(s) 501 to perform any, all, or some of the processes or methods described above in connection with at least one of FIG. 1, 2, 3, or 4A-4F.

System 500 may further include I/O devices such as devices 505-508, including network interface device(s) 505, optional input device(s) 506, and other optional I/O device(s) 507. Network interface device 505 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with display device 504), a pointer device such as a stylus, and/or a keyboard (e.g., physical keyboard or a virtual keyboard displayed as part of a touch sensitive screen). For example, input device 506 may include a touch screen controller coupled to a touch screen. The touch screen and touch screen controller can, for example, detect contact and movement or a break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

I/O devices 507 may include an audio device. An audio device may include a speaker and/or a microphone to facilitate voice-enabled functions, such as voice recognition, voice replication, digital recording, and/or telephony functions. Other I/O devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor(s) 501. For various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. In addition, a flash device may be coupled to processor(s) 501, e.g., via a serial optional peripheral interface (SPI). This flash device may provide for non-volatile storage of system software, including a basic input/output software (BIOS) and other firmware.

Furthermore, at least one of ARIS logic/module 528C or HDR image generation logic/module 529C may be a specialized stand-alone computing device that is formed from hardware, software, or a combination thereof. For one embodiment, at least one of ARIS logic/module 528C or HDR image generation logic/module 529C performs any, all, or some of the processes or methods described above in connection with at least one of FIG. 1, 2, 3, or 4A-4F.

Storage device 508 may include computer-accessible storage medium 509 (also known as a machine-readable storage medium or a computer-readable medium) on which is stored one or more sets of instructions or software (e.g., at least one of ARIS logic/module 528D or HDR image generation logic/module 529D) embodying one or more of the methodologies or functions described above in connection with FIG. 1, 2, 3, or 4A-4F. For one embodiment, the storage device 508 includes at least one of ARIS logic/module 528D or HDR image generation logic/module 529D, which are instructions. When the instructions represented by at least one of ARIS logic/module 528D or HDR image generation logic/module 529D are executed by the processor(s) 501, the instructions 528D and/or the instructions 529D cause the processor(s) 501 to perform any, all, or some of the processes or methods described above in connection with at least one of FIG. 1, 2, 3, or 4A-4F. One or more of logic/modules 528A, 528B, 528C, 528D, 529A, 529B, 529C, or 529D may be transmitted or received over a network 511 via network interface device 505.

Computer-readable storage medium 509 can store some or all of the software functionalities of at least one of ARIS logic/module 528D or HDR image generation logic/module 529D described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Note that while system 500 is illustrated with various components of a data processing system, it is not intended to represent any particular architecture or manner of interconnecting the components; as such, details are not germane to the embodiments described herein. It will also be appreciated that network computers, handheld computers, mobile phones, servers, and/or other data processing systems, which have fewer components or perhaps more components, may also be used with the embodiments described herein.

Description of at least one of the embodiments set forth herein is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known processes and manufacturing techniques have not been described in particular detail in order to not unnecessarily obscure the embodiments. Reference throughout this specification to "one embodiment," "an embodiment," "another embodiment," "other embodiments," "some embodiments," and their variations means that a particular feature, structure, configuration, or characteristic described in connection with the embodiment is included in at least one embodiment. Thus, the appearances of the phrase "for one embodiment," "for an embodiment," "for another embodiment," "in other embodiments," "in some embodiments," or their variations in various places throughout this specification are not necessarily referring to the same embodiment. Furthermore, the particular features, structures, configurations, or characteristics may be combined in any suitable manner in one or more embodiments.

In the following description and claims, the terms "coupled" and "connected," along with their derivatives, may be used. It should be understood that these terms are not intended as synonyms for each other. "Coupled" is used to indicate that two or more elements or components, which may or may not be in direct physical or electrical contact with each other, co-operate or interact with each other. "Connected" is used to indicate the establishment of communication between two or more elements or components that are coupled with each other.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

Although the processes or methods (e.g., in FIG. 1, 2, 3, or 4A-4F, etc.) are described above in terms of some sequential operations, it should be appreciated that some of the operations described may be performed in a different order. Moreover, some operations in the processes or methods described above (e.g., in FIG. 1, 2, 3, or 4A-4F, etc.) may be performed in parallel rather than sequentially. Additionally, some of the operations in the processes or methods described above (e.g., in FIG. 1, 2, 3, or 4A-4F, etc.) may be omitted altogether depending on the implementation. Embodiments described herein are not described with reference to any particular programming language. It will be appreciated that a variety of programming languages may be used to implement the teachings of embodiments of the invention as described herein. In utilizing the various aspects of the embodiments described herein, it would become apparent to one skilled in the art that combinations, modifications, or variations of the above embodiments are possible for managing components of processing system to increase the power and performance of at least one of those components. Thus, it will be evident that various modifications may be made thereto without departing from the broader spirit and scope of at least one of the inventive concepts set forth in the following claims. The specification and drawings are, accordingly, to be regarded in an illustrative sense rather than a restrictive sense.

In the development of any actual implementation of one or more of the inventive concepts set forth in the embodiments described herein (e.g., as a software and/or hardware development project, etc.), numerous decisions must be made to achieve the developers' specific goals (e.g., compliance with system-related constraints and/or business-related constraints). These goals may vary from one implementation to another, and this variation could affect the actual implementation of one or more of the inventive concepts set forth in the embodiments described herein. Furthermore, such development efforts might be complex and time-consuming, but would nevertheless be a routine undertaking for a person having ordinary skill in the art in the design and/or implementation of one or more of the inventive concepts set forth in the embodiments described herein.

As used herein, the phrase "at least one of A, B, or C" includes A alone, B alone, C alone, a combination of A and B, a combination of B and C, a combination of A and C, and a combination of A, B, and C. In other words, the phrase "at least one of A, B, or C" means A, B, C, or any combination thereof such that one or more of a group of elements consisting of A, B and C, and should not be interpreted as requiring at least one of each of the listed elements A, B and C, regardless of whether A, B and C are related as categories or otherwise. Furthermore, the use of the article "a" or "the" in introducing an element should not be interpreted as being exclusive of a plurality of elements. Also, the recitation of "A, B and/or C" is equal to "at least one of A, B or C."

What is claimed is:

1. A non-transitory computer readable medium comprising instructions, which when executed by one or more processors, cause the one or more processors to:
   obtain a first image of a scene with first exposure settings;
   obtain a second image of the scene with second exposure settings, wherein the first and second exposure settings are different from each other;
   select one of the first and second images as a reference image based on a comparison of the first and second images;
   select a first image processing technique to be a selected image processing technique when the first image is selected as the reference image;
   select a second image processing technique to be the selected image processing technique when the second image is selected as the reference image, wherein the first image processing technique and second image processing technique are different; and
   process the first and second images using the selected image processing technique.

2. The non-transitory computer readable medium of claim 1, wherein the first image comprises an EV0 image and the second image comprises an EV− image.

3. The non-transitory computer readable medium of claim 2, further comprising additional instructions, which, when executed by one or more processors, cause the one or more processors to:
   generate an output high dynamic range (HDR) image using the processed first and second images.

4. The non-transitory computer readable medium of claim 2, wherein, when the second image is the reference image, the selected second image processing technique comprises an advanced image registration technique, and wherein, when the first image is the reference image, the selected first image processing technique comprises a simple image registration technique.

5. The non-transitory computer readable medium of claim 2, wherein, when the first image is the reference image, the selected first image processing technique comprises an image registration technique selected from a first list of potential image registration techniques, and wherein, when the second image is the reference image, the selected second image processing technique comprises an image registration technique selected from a second list of potential image registration techniques.

6. The non-transitory computer readable medium of claim 1, wherein the instructions for causing the one or more processors to perform the comparison of the first and second images comprise instructions for causing the one or more processors to determine a difference between corresponding pixels in the first image and the second image.

7. The non-transitory computer readable medium of claim 1, further comprising additional instructions, which, when executed by one or more processors, cause the one or more processors to:
   downsample the first and second images prior to the comparison.

8. The non-transitory computer readable medium of claim 1, wherein the instructions for causing the one or more processors to perform the comparison of the first and second images comprise instructions for causing the one or more processors to:
   compare one or more pixels in the first image to one or more corresponding pixels in the second image; and
   determine a number of potential artifact pixels in the first and second images, based, at least in part, on the comparison.

9. The non-transitory computer readable medium of claim 8, wherein each artifact pixel is further assigned a weight value, based, at least in part, on one or more of:
   the pixel's location in the first and second images, and
   the scene's content corresponding to the pixel's location.

10. The non-transitory computer readable medium of claim 8, wherein the instructions for causing the one or more processors to select one of the first and second images as the reference image based on the comparison of the first and second images comprise instructions for causing the one or more processors to:
    select the first image as the reference image when the number of potential artifact pixels is less than a threshold value; and
    select the second image as the reference image when the number of potential artifact pixels is greater than or equal to the threshold value.

11. A processing system, comprising:
    an imaging device comprising one or more image sensors, the imaging device configured to capture one or more images;
    memory storing data, the data comprising instructions; and
    one or more processors coupled to the imaging device and the memory, wherein the one or more processors are configured to execute the instructions to:
      obtain a first image of a scene with first exposure settings;
      obtain a second image of the scene with second exposure settings, wherein the first and second exposure settings are different from each other;
      select one of the first and second images as a reference image based on a comparison of the first and second images;
      select a first image processing technique to be a selected image processing technique when the first image is selected as the reference image;
      select a second image processing technique to be the selected image processing technique when the second image is selected as the reference image, wherein the first image processing technique and second image processing technique are different; and
      process the first and second images using the selected image processing technique.

12. The processing system of claim 11, wherein the first image comprises an EV0 image and the second image comprises an EV− image.

13. The processing system of claim 12, wherein the data comprises additional instructions and wherein the one or more processors are configured to execute the additional instructions to:
    generate an output high dynamic range (HDR) image using the processed images.

14. The processing system of claim 12, wherein:
    when the first image is selected as the reference image, the selected first image processing technique comprises an image processing technique selected from a first list of potential image registration techniques; and
    when the second image is selected as the reference image, the selected second image processing technique comprises an image processing technique selected from a second list of potential image registration techniques.

15. The processing system of claim 11, wherein the one or more processors that are configured to execute the instructions to perform the comparison of the first and second images comprise one or more processors that are configured to execute the instructions to:
  compare one or more pixels in the first image to one or more corresponding pixels in the second image; and
  determine a number of potential artifact pixels in the first and second images, based, at least in part, on the comparison.

16. The processing system of claim 15, wherein the one or more processors that are configured to execute the instructions to select one of the first and second images as the reference image based on the comparison of the first and second images comprise one or more processors that are configured to execute the instructions to:
  select the first image as the reference image when the number of potential artifact pixels is less than a threshold value; and
  select the second image as the reference image when the number of potential artifact pixels is greater than or equal to the threshold value.

17. A method of processing images, comprising:
  obtaining a first image of a scene with first exposure settings;
  obtaining a second image of the scene with second exposure settings, wherein the first and second exposure settings are different from each other;
  selecting one of the first and second images as a reference image based on a comparison of the first and second images;
  selecting a first image processing technique to be a selected image processing technique when the first image is selected as the reference image;
  selecting a second image processing technique to be the selected image processing technique when the second image is selected as the reference image, wherein the first image processing technique and second image processing technique are different; and
  processing the first and second images using the selected image processing technique.

18. The method of claim 17, wherein the first image comprises an EV0 image and the second image comprises an EV− image.

19. The method of claim 18, wherein:
  when the first image is selected as the reference image, the selected first image processing technique comprises one or more simple image registration techniques; and
  when the second image is selected as the reference image, the selected second image processing technique comprises one or more advanced image registration techniques.

20. The method of claim 18, wherein selecting one of the first and second images as the reference image based on the comparison of the first and second images comprises:
  selecting the first image as the reference image when a number of potential artifact pixels in the first and second images is less than a threshold value; and
  selecting the second image as the reference image when the number of potential artifact pixels in the first and second images is greater than or equal to the threshold value.

* * * * *